(12) United States Patent
Jiang et al.

(10) Patent No.: US 8,953,873 B2
(45) Date of Patent: Feb. 10, 2015

(54) METHOD FOR OBJECTIVELY EVALUATING QUALITY OF STEREO IMAGE

(71) Applicant: Ningbo University, Ningbo, Zhejiang (CN)

(72) Inventors: Gangyi Jiang, Zhejiang (CN); Junming Zhou, Zhejiang (CN); Mei Yu, Zhejiang (CN); Fucui Li, Zhejiang (CN); Zongju Peng, Zhejiang (CN); Feng Shao, Zhejiang (CN)

(73) Assignee: Ningbo University, Ningbo, Zhejiang Province (CN)

( * ) Notice: Subject to any disclaimer, the term of this patent is extended or adjusted under 35 U.S.C. 154(b) by 150 days.

(21) Appl. No.: 13/775,197

(22) Filed: Feb. 24, 2013

(65) Prior Publication Data
US 2014/0064604 A1    Mar. 6, 2014

(51) Int. Cl.
*G06K 9/00*    (2006.01)
*G06T 7/00*    (2006.01)

(52) U.S. Cl.
CPC .............. *G06K 9/00201* (2013.01); *G06T 7/00* (2013.01)
USPC ........................................................ 382/154

(58) Field of Classification Search
USPC ........................................................ 382/154
See application file for complete search history.

(56) References Cited

U.S. PATENT DOCUMENTS 7,106,899 B2 *    9/2006    Zhang et al. .................. 382/154

OTHER PUBLICATIONS (Aldo Maalou, "Cyclop: A Stereo Color Image Quality Assessment Metric", IEEE 2011).*
(A Criminisi, "Efficient Dense Stereo wit Occlusions for New View-Synthesis by Four State Dynamice Programming". 2006 Springer Science, International Jornal of Computer Visions).*

* cited by examiner

*Primary Examiner* — Stephen R Koziol
*Assistant Examiner* — Totam Le (57) ABSTRACT

A method for objectively evaluating quality of a stereo image is provided. The method obtains a cyclopean image of a stereo image formed in the human visual system by simulating a process that the human visual system deals with the stereo image. The cyclopean image includes three areas: an occlusion area, a binocular fusion area and a binocular suppression area. Representing characteristics of the image according to the singular value of the image has a strong stability. According characteristics of different areas of the human visual system while dealing with the cyclopean image, the distortion degree of the cyclopean image corresponding to the testing stereo image is presented by the singular value distance between cyclopean images respectively corresponding to the testing stereo image and the reference stereo image, in such a manner that an overall visual quality of the testing stereo image is finally evaluated.

10 Claims, 5 Drawing Sheets

METHOD FOR OBJECTIVELY EVALUATING QUALITY OF STEREO IMAGE

BACKGROUND OF THE PRESENT INVENTION

1. Field of Invention

The present invention relates to a technique for evaluating stereo image quality, and more particularly to a method for objectively evaluating stereo image quality based on binocular fusion and binocular suppression.

2. Description of Related Arts

With the progressive development of three-dimensional display technologies, stereo image technologies are widely utilized in various fields. However, how to establish an effective method for evaluating stereo image quality which is in accordance with visual perception of human beings has been a hot topic of research in fields of stereo image processing or compression.

From the point of methodology, the stereo image quality evaluation can be classified as two methods, which are respectively a subjective quality-evaluation method and an objective quality-evaluation method. The subjective quality-evaluation method means processing visual perception and quality evaluation on stereo images by a large number of testers. Since the subjective quality-evaluation method is very inconvenient to operate and consumes plenty of time, manpower and physical resources, the ultimate object of stereo image quality assessment is to establish an objective quality-evaluation model which is capable of automatically evaluating and has an evaluation result in accordance with the subjective quality-evaluation result.

The objective quality-evaluation method predicts visual quality of the stereo image to be tested by modeling distortion information, and thus plays an important role in fields of video processing. For example, the objective quality-evaluation method is utilized for monitoring and regulating image quality, optimizing algorithm and parameter settings, evaluating performances of system or algorithm and etc. Currently, multiple methods for objectively evaluating quality of a stereo image are presented by researchers. A first representative method thereof is to evaluate left-view and right-view images of the stereo image respectively by a 2D quality evaluation method directly, and an average value of the results obtained serves as a predictive value for the quality of the stereo image. A second representative method thereof is to separate the stereo-image quality evaluation into two parts: 2D distortion evaluation and stereo distortion evaluation. In the first method, the stereo image is regarded as an assembly of left-view image and right-view image which are independently existed completely without any consideration for the special characteristics of the stereo image. Based on the first method, the second method evaluates the specific quality distortion of the stereo image simply by depth or disparity information thereof. It is obvious that both of the two methods mentioned above are extension or improvement of the 2D-image quality evaluation method. Compared with a 2D image, the stereo image not simply has an extra channel added, and quality evaluation thereof has several difficult problems as following:

(1) the problem of evaluating the specific distortion type of the stereo image, such as crosstalk, cardboard and keystone;

(2) the problem of presenting depth perception information of the stereo image and evaluating distortion thereof;

(3) the problem of interaction between the left-view and the right-view of a stereo image.

Currently, the problems mentioned above have not been solved yet, which leads to inconsistency between the visual quality of the stereo image and evaluating results of the conventional objective quality-evaluation model.

SUMMARY OF THE PRESENT INVENTION

A technical object of the present invention is to provide a method for objectively evaluating quality of a stereo image based on binocular fusion and binocular suppression, which is capable of objectively reflecting visual quality variation of the stereo image influenced by various methods of image processing and compressing, so as to be consistent with characteristics of human visual system.

In order to solve the technical problems mentioned above, technical solutions utilized by the present invention are as following. A method for objectively evaluating quality of a stereo image comprises following steps of:

① defining an original stereo image which is utilized for referring in an objective quality evaluation of the stereo image as a reference stereo image, a left-view of the reference stereo image is denoted as $I_l$, a right-view of the reference stereo image is denoted as $I_r$, a cyclopean image of the reference stereo image formed in a human visual system is denoted as C;

defining a distortion image of the reference stereo image which is used for testing in the objective quality evaluation of the stereo image as a testing stereo image, a left-view of the testing stereo image is denoted as $\hat{I}_l$, a right-view of the testing stereo image is denoted as $\hat{I}_r$, a cyclopean image of the testing stereo image formed in the human visual system is denoted as $\hat{C}$, wherein sizes of the left-view of the reference stereo image $I_l$, the right-view of the reference stereo image $I_r$, the left-view of the testing stereo image $\hat{I}_l$, and the right-view of the testing stereo image $\hat{I}_r$ are all denoted as W×H, wherein W refers to a width thereof, and H refers to a height thereof;

② classifying the cyclopean image $\hat{C}$ of the testing stereo image formed in the human visual system into three areas, wherein:

a first area thereof is an occlusion area, which is denoted as $\hat{R}_{occ}$, information of the occlusion area $\hat{R}_{occ}$ exists only in the left-view or the right-view of the testing stereo image;

a second area thereof is a binocular suppression area, which is denoted as $\hat{R}_{bs}$, information of the binocular suppression area $\hat{R}_{bs}$ is binocular information having great image content difference or great disparity between the left-view and the right-view of the testing stereo image; and a third area thereof is a binocular fusion area, which is denoted as $\hat{R}_{bf}$, information of the binocular fusion area $\hat{R}_{bf}$ is binocular information having similar image content and small disparity between the left-view and the right-view of the testing stereo image;

③ dividing the cyclopean image $\hat{C}$ of the testing stereo image formed in the human visual system into a plurality of image blocks which are non-overlapped with each other and have a size of k×k, classifying all of the image blocks into three types: an occlusion block, a binocular suppression block and a binocular fusion block, updating $\hat{R}_{occ}$, $\hat{R}_{bs}$ and $\hat{R}_{bf}$ according to types of the image blocks, so as to obtain an updated occlusion area $\hat{R}_{occ}'$, an updated binocular suppression area $\hat{R}_{bs}'$ and an updated binocular fusion area $\hat{R}_{bf}'$, in the cyclopean image C of the reference stereo image formed in the human visual system, obtaining an area $R_{occ}'$ corresponding to a position of $\hat{R}_{occ}'$, an area $R_{bs}'$ corresponding to a position of $\hat{R}_{bs}'$, and an area $R_{bf}'$ corresponding to a position of $\hat{R}_{bf}'$;

processing singular value decomposition respectively on all of the image blocks having a size of k×k in the area $\hat{R}_{occ}{}'$, an area $\hat{R}_{occ}{}'$, corresponding to left-view of it $\hat{R}_{bs}{}'$, an area $\hat{R}_{bs}{}^{rr}$ corresponding to right-view of $\hat{R}_{bs}{}'$, an area $\hat{R}_{bf}{}^{l}$ corresponding to left-view of $\hat{R}_{bf}{}'$, an area $\hat{R}_{bf}{}^{rr}$ corresponding to right-view of $\hat{R}_{bf}{}'$, the area $R_{occ}{}'$, an area $R_{bs}{}^{l}$ corresponding to left-view of $R_{bs}{}'$, an area $R_{bs}{}^{rr}$ corresponding to right-view of $R_{bs}{}'$, an area $R_{bf}{}^{l}$ corresponding to left-view of $R_{bf}{}'$, and an area $R_{bf}{}^{rr}$ corresponding to right-view of $R_{bf}{}'$, in such a manner that singular values respectively corresponding to each image block are obtained, wherein k>1;

④ obtaining an overall distortion degree $Q_{occ}$ of $\hat{R}_{occ}{}'$ according to singular value distances between all of the image blocks which are in corresponding positions in $\hat{R}_{occ}{}'$ and $R_{occ}{}'$ and have a size of k×k, obtaining an overall distortion degree $Q_{bs}$ of $\hat{R}_{bs}{}'$ according to singular value distances between all of the image blocks which are in corresponding positions in $\hat{R}_{bs}{}^{h}$ and $R_{bs}{}^{h}$ and have a size of k×k, and singular value distances between all of the image blocks which are in corresponding positions in $\hat{R}_{bs}{}^{rr}$ and $R_{bs}{}^{rr}$ and have a size of k×k, and obtaining an overall distortion degree $Q_{bf}$ of $\hat{R}_{bf}{}'$ according to singular value distances between all of the image blocks which are in corresponding positions in $\hat{R}_{bf}{}^{h}$ and $R_{bf}{}^{h}$ and have a size of k×k, and singular value distances between all of the image blocks which are in corresponding positions of $\hat{R}_{bf}{}^{rr}$ and $R_{bf}{}^{rr}$ and have a size of k×k; and ⑤ according to the overall distortion degree $Q_{occ}$ of $\hat{R}_{occ}$, the overall distortion degree $Q_{bs}$ of $\hat{R}_{bs}{}'$ and the overall distortion degree $Q_{bf}$ of $\hat{R}_{bf}{}'$, calculating an overall distortion degree Q of the testing stereo image by an equation of linear regression, wherein $Q=a\times Q_{occ}+b\times Q_{bs}+c\times Q_{bf}$, wherein a, b and c are all coefficients and satisfy:

$$\begin{cases} a+b+c=1 \\ 0 \le a \le 1 \\ 0 \le b \le 1 \\ 0 \le c \le 1 \end{cases};$$

wherein a specific process of the step ② mentioned above comprises:

②-1 denoting a pixel having a position coordinate of (x,y) in the left-view image $I_l$ of the reference stereo image as $p_{x,y}{}^{l}$, denoting a pixel having a position coordinate of (s,t) in the right-view image $I_r$ of the reference stereo image as $p_{s,t}{}^{r}$, denoting a pixel having a position coordinate of (x,y) in the left-view image $\hat{I}_l$ of the testing stereo image as and denoting a pixel having a position coordinate of (s,t) in the right-view image $\hat{I}_r$ of the testing stereo image as $\hat{p}_{s,t}{}^{r}$, wherein $1 \le x \le W$, $1 \le y \le H$, $1 \le s \le W$ and $1 \le t \le H$;

②-2 processing stereo matching on the reference stereo image, so as to obtain a horizontal disparity and a vertical disparity of each pixel of the reference stereo image, wherein a specific process thereof comprises:

judging whether $p_{x,y}{}^{l}$ is matched with $p_{s,t}{}^{r}$, wherein:

if $p_{x,y}{}^{l}$ is matched with $p_{s,t}{}^{r}$, matching relationship of $p_{x,y}{}^{l}$ and $p_{s,t}{}^{r}$ is presented as $(p_{x,y}{}^{l}, p_{s,t}{}^{r})$, horizontal disparities of $p_{x,y}{}^{l}$ and $p_{s,t}{}^{r}$ are both denoted as $d_{x,y}{}^{h}$, wherein $d_{x,y}{}^{h}=|s-x|$, vertical disparities of $p_{x,y}{}^{l}$ and $p_{s,t}{}^{r}$ are both denoted as $d_{x,y}{}^{v}$, wherein $d_{x,y}{}^{v}=|t-y|$, if no pixel is matched with $p_{x,y}{}^{l}$ in the right-view $I_r$ of the reference stereo image, matching relationship of $p_{x,y}{}^{l}$ is presented as $(p_{x,y}{}^{l},\phi)$, and the horizontal disparity and the vertical disparity of $p_{x,y}{}^{l}$ are both determined to be 255, and if no pixel is matched with $p_{s,t}{}^{r}$ in the left-view image $I_r$ of the reference stereo image, matching relationship of $p_{x,y}{}^{l}$ is presented as $(p_{x,y}{}^{l},\phi)$, and the horizontal disparity and the vertical disparity of $p_{x,y}{}^{l}$ are both determined to be 255, wherein "||" is an absolute value sign, "$\phi$" is an empty set sign;

②-3 processing stereo matching on the testing stereo image, so as to obtain a horizontal disparity and a vertical disparity of each pixel of the testing stereo image, wherein a specific process thereof comprising:

judging whether $\hat{p}_{x,y}{}^{l}$ is matched with $\hat{p}_{s,t}{}^{r}$ wherein:

if $p_{x,y}{}^{l}$ is matched with $\hat{p}_{s,t}{}^{r}$ matching relationship of $\hat{p}_{x,y}{}^{l}$ and $\hat{p}_{s,t}{}^{r}$ is presented as $(\hat{p}_{x,y}{}^{l}, \hat{p}_{s,t}{}^{r})$, the horizontal disparities of $\hat{p}_{x,y}{}^{l}$ and $\hat{p}_{s,t}{}^{r}$ are both denoted as $\hat{d}_{x,y}{}^{h}$, wherein a $\hat{d}_{x,y}{}^{h}=|s-x|$ the vertical disparities of $\hat{p}_{x,y}{}^{l}$ and $\hat{p}_{s,t}{}^{r}$ are both denoted as $\hat{d}_{x,y}{}^{v}$, wherein $\hat{d}_{x,y}{}^{v}=|t-y|$, if no pixel is matched with $\hat{p}_{x,y}{}^{l}$ in the right-view $\hat{I}_r$ of the testing stereo image, matching relationship of $\hat{p}_{x,y}{}^{l}$ is presented as $(\hat{p}_{x,y}{}^{l},\phi)$, and the horizontal disparity and the vertical disparity of $\hat{p}_{x,y}{}^{l}$ are both determined to be 255, and if no pixel is matched with $\hat{p}_{x,y}{}^{l}$ in the left-view $\hat{I}_r$ of the testing stereo image, matching relationship of $\hat{p}_{s,t}{}^{r}$ is presented as $(\phi,\hat{p}_{s,t}{}^{r})$, and the horizontal disparity and the vertical disparity of $\hat{p}_{s,t}{}^{r}$ are both determined to be 255, wherein "||" is an absolute value sign, "$\phi$" is an empty set sign;

②-4 dividing the cyclopean image of the testing stereo image formed in the human visual system $\hat{C}$ into an occlusion area $\hat{R}_{occ}$ and a match area $\hat{R}_{match}$, wherein the occlusion area $\hat{R}_{occ}$ comprises a left-view occlusion area $\hat{R}_{occ}{}^{l}$ and a right-view occlusion area $\hat{R}_{occ}{}^{r}$, wherein $\hat{R}_{occ}=\hat{R}_{occ}{}^{l} \cup \hat{R}_{occ}{}^{r}$, wherein the left-view occlusion area $\hat{R}_{occ}{}^{l}$ is a set of pixels having a matching relationship of $(\hat{p}_{x,y}{}^{l},\phi)$ in the left-view $\hat{I}_l$ of the testing stereo image, which are presented as $\hat{R}_{occ}{}^{l}=\{\hat{p}_{x,y}{}^{l}| (\hat{p}_{x,y}{}^{l},\phi) \wedge \hat{p}_{x,y}{}^{l} \in \hat{I}_l\}$, the right-view occlusion area $\hat{R}_{occ}{}^{r}$ is a set of pixels having a matching relationship of $(\phi, \hat{p}_{s,t}{}^{r})$ in the right-view $\hat{I}_r$ of the testing stereo image, which is presented as $\hat{R}_{occ}{}^{r}=\{\hat{p}_{s,t}{}^{r}|(\phi,\hat{p}_{s,t}{}^{r}) \wedge \hat{p}_{s,t}{}^{r} \in \hat{I}_r\}$, the match area $\hat{R}_{match}$ is a set of matched pixels of the left-view $\hat{I}_l$ of the testing stereo image and the right-view $\hat{I}_r$ of the testing stereo image, which has a matching relationship of $(\hat{p}_{x,y}{}^{l},\hat{p}_{s,t}{}^{r})$, wherein "$\cup$" is an operational sign of a union, "$\wedge$" is an operational sign of "and"; and ②-5 further dividing the match area $\hat{R}_{match}$ into a binocular suppression area $\hat{R}_{bs}$ and a binocular fusion area $\hat{R}_{bf}$, wherein:

the binocular suppression area $\hat{R}_{bs}$ is an integrated area formed by processing binocular suppression on the left-view corresponding area $\hat{R}_{bs}{}^{l}$ of $\hat{R}_{bs}$ and the right-view corresponding area $\hat{R}_{bs}{}^{r}$ of $\hat{R}_{bs}$, and the binocular fusion area $\hat{R}_{bf}$ is an integrated area formed by processing binocular fusion on the left-view corresponding area $\hat{R}_{bf}{}^{l}$ of $\hat{R}_{bf}$ and the right-view corresponding view $\hat{R}_{bf}{}^{r}$ of $\hat{R}_{bf}$, wherein:

$\hat{R}_{bs}{}^{l}=\{\hat{p}_{x,y}{}^{l}|\hat{p}_{x,y}{}^{l}\in \hat{I}_l \wedge \hat{p}_{s,t}{}^{r}\in \hat{I}_r \wedge (\hat{p}_{x,y}{}^{l},\hat{p}_{s,t}{}^{r}) \wedge |\hat{d}_{x,y}{}^{h}|+|\hat{d}_{x,y}{}^{v}|>|d_{x,y}{}^{h}|+|d_{x,y}{}^{v}|\}$, $\hat{R}_{bs}{}^{r}=\{\hat{p}_{x,y}{}^{r}|\hat{p}_{x,y}{}^{l}\in \hat{I}_l \wedge \hat{p}_{s,t}{}^{r}\in \hat{I}_r \wedge (\hat{p}_{x,y}{}^{l},\hat{p}_{s,t}{}^{r}) \wedge |\hat{d}_{x,y}{}^{h}|+|\hat{d}_{x,y}{}^{v}|>|d_{x,y}{}^{h}|+|d_{x,y}{}^{v}|\}$, $\hat{R}_{bf}{}^{l}=\{\hat{p}_{s,t}{}^{r}|\hat{p}_{x,y}{}^{l}\in \hat{I}_l \wedge \hat{p}_{s,t}{}^{r}\in \hat{I}_r \wedge (\hat{p}_{x,y}{}^{l},\hat{p}_{s,t}{}^{r}) \wedge |\hat{d}_{x,y}{}^{h}|+|\hat{d}_{x,y}{}^{v}|\le|d_{x,y}{}^{h}|+|d_{x,y}{}^{v}|\}$, and $\hat{R}_{bf}{}^{r}=\{\hat{p}_{s,t}{}^{r}|\hat{p}_{x,y}{}^{l}\in \hat{I}_l \wedge \hat{p}_{s,t}{}^{r}\in \hat{I}_r \wedge (\hat{p}_{x,y}{}^{l},\hat{p}_{s,t}{}^{r}) \wedge |\hat{d}_{x,y}{}^{h}|+|\hat{d}_{x,y}{}^{v}|\le|d_{x,y}{}^{h}|+|d_{x,y}{}^{v}|\}$;

wherein specific process of the step ③ mentioned above comprises:

③-1 dividing the cyclopean image $\hat{C}$ of the testing stereo image formed in the human visual system into a plurality of image blocks which are non-overlapped with each other and have a size of k×k, classifying all of the image blocks of the cyclopean image $\hat{C}$ of the testing stereo image formed in the human visual system into three types: an occlusion block, a binocular suppression block and a binocular fusion block, wherein specific process of the classifying comprises:

denoting any one of the image blocks of the cyclopean image $\hat{C}$ of the testing stereo image formed in the human visual system as $\hat{B}$, and judging whether there is a pixel belonging to $\hat{R}_{occ}$ in the $\hat{B}$, wherein if yes, mark $\hat{B}$ as a occlusion block; if no, further judge whether there is a pixel belonging to $\hat{R}_{bs}$ in $\hat{B}$, if yes, mark $\hat{B}$ as a binocular suppression block, if no mark $\hat{B}$ as a binocular fusion block, wherein k>1;

③-2 defining an area constituted by all of the occlusion blocks of the cyclopean image $\hat{C}$ of the testing stereo image formed in the human visual system as an updated occlusion area, which is denoted as $\hat{R}_{occ}'$, defining an area constituted by all of the binocular suppression blocks of the cyclopean image $\hat{C}$ of the testing stereo image formed in the human visual system as an updated binocular suppression area, which is denoted as $\hat{R}_{bs}'$, and defining an area constituted by all of the binocular fusion blocks of the cyclopean image $\hat{C}$ of the testing stereo image formed in the human visual system as an updated binocular fusion area, which is denoted as $\hat{R}_{bf}'$, wherein the left-view corresponding area of the updated occlusion area $\hat{R}_{occ}'$ is denoted as $\hat{R}_{occ}^{l}$, the right-view corresponding area of $\hat{R}_{occ}'$ is denoted as $\hat{R}_{occ}^{r}$, the left-view corresponding area of the updated binocular suppression area $\hat{R}_{bs}'$ is denoted as $\hat{R}_{bs}^{h}$, the right-view corresponding area of $\hat{R}_{bs}'$ is denoted as $\hat{R}_{bs}^{r}$, the left-view corresponding area of the updated binocular fusion area $\hat{R}_{bf}'$ is denoted as $\hat{R}_{bf}^{h}$, and the right-view corresponding area of $\hat{R}_{bf}'$ is denoted as $\hat{R}_{bf}^{r}$;

③-3 denoting the area corresponding to the position of $\hat{R}_{occ}'$ in the cyclopean image C of the reference stereo image formed in the human visual system as $\hat{R}_{occ}'$, wherein $R_{occ}' = R_{occ}^{h} \cup R_{occ}^{r}$, wherein "$\cup$" is an operational sign for union in a set, wherein $R_{occ}^{h}$ is the area corresponding to the position of $\hat{R}_{occ}^{h}$ in the cyclopean image C of the reference stereo image formed in the human visual system, $R_{occ}^{h} = \{p_{x,y}^{l} | p_{x,y}^{l} \in I_{l} \wedge \hat{p}_{x,y}^{l} \in \hat{R}_{occ}^{h}\}$, wherein $R_{occ}^{r}$ is the area corresponding to the position of $\hat{R}_{occ}^{r}$ in the cyclopean image C of the reference stereo image formed in the human visual system, $R_{occ}^{r} = \{p_{s,t}^{r} | p_{s,t}^{r} \in I_{r} \wedge \hat{p}_{s,t}^{r} \in \hat{R}_{occ}^{r}\}$;

③-4 denoting the area corresponding to the position of $\hat{R}_{bs}^{h}$ in the cyclopean image C of the reference stereo image formed in the human visual system as $R_{bs}^{h}$, wherein $R_{bs}^{h} = \{p_{x,y}^{l} | p_{x,y}^{l} \in I_{l} \wedge \hat{p}_{x,y}^{l} \in \hat{R}_{bs}^{h}\}$, and denoting the area corresponding to the position of $\hat{R}_{bs}^{r}$ in the cyclopean image C of the reference stereo image formed in the human visual system as $R_{bs}^{r}$, wherein $R_{bs}^{r} = \{p_{s,t}^{r} | p_{s,t}^{r} \in I_{r} \wedge \hat{p}_{s,t}^{r} \in \hat{R}_{bs}^{r}\}$;

③-5 denoting the area corresponding to the position of $\hat{R}_{bf}^{h}$ in the cyclopean image C of the reference stereo image formed in the human visual system as $R_{bf}^{h}$, wherein $R_{bf}^{h} = \{p_{x,y}^{l} | p_{x,y}^{l} \in I_{l} \wedge \hat{p}_{x,y}^{l} \in \hat{R}_{bf}^{h}\}$, and denoting the area corresponding to the position of $\hat{R}_{bf}^{r}$ in the cyclopean image C of the reference stereo image formed in the human visual system as $R_{bf}^{r}$, wherein $R_{bf}^{r} = \{p_{s,t}^{r} | p_{s,t}^{r} \in I_{r} \wedge \hat{p}_{s,t}^{r} \in \hat{R}_{bf}^{r}\}$; and ③-6 processing the singular value decomposition respectively on all of the image blocks having the size of k×k in $\hat{R}_{occ}'$, $\hat{R}_{bs}^{h}$, $\hat{R}_{bs}^{r}$, $\hat{R}_{bf}^{h}$, $\hat{R}_{bf}^{r}$, $R_{occ}'$, $R_{bs}^{h}$, $R_{bs}^{r}$, $R_{bf}^{h}$ and $R_{bf}^{r}$, in such a manner that the singular values respectively corresponding to all image blocks having the size of k×k and in $\hat{R}_{occ}'$, $\hat{R}_{bs}^{h}$, $\hat{R}_{bs}^{r}$, $\hat{R}_{bf}^{h}$, $\hat{R}_{bf}^{r}$, $R_{occ}'$, $R_{bs}^{h}$, $R_{bs}^{r}$, $R_{bf}^{h}$ and $R_{bf}^{r}$ are obtained, wherein in the step ③-1, k=4;

wherein specific process of the step ④ mentioned above comprises:

④-1 calculating the singular value distances between the image blocks which are in all corresponding positions of $\hat{R}_{occ}'$ and $R_{occ}'$ and have the size of k×k, wherein an ith occlusion block in $\hat{R}_{occ}'$ is denoted as $\hat{B}_i$, in $R_{occ}'$ an ith occlusion block in a corresponding position of $\hat{B}_i$ is denoted as $B_i$, a singular value distance between $\hat{B}_i$ and $B_i$ is calculated and is denoted as $D_{occ}(i)$, $$D_{occ}(i) = \sqrt{\sum_{j=1}^{k} (s_{i,j} - \hat{s}_{i,j})^2},$$

calculating the singular value distances corresponding to all of the occlusion blocks in $\hat{R}_{occ}'$ as the overall distortion degree of $\hat{R}_{occ}'$, which is denoted as $Q_{occ}$, wherein $$Q_{occ} = \frac{1}{N_{occ}} \sum_{i=1}^{N_{occ}} |D_{occ}(i) - D_{occ}(m)|,$$

wherein $1 \leq i \leq N_{occ}$; $N_{occ}$ refers to a number of all of the occlusion blocks in $\hat{R}_{occ}'$, and $N_{occ}$ is also a number of all of the occlusion blocks in $R_{occ}'$, $1 \leq j \leq k$, k refers to a number of singular values in one of the image blocks, $s_{i,j}$ refers to a jth singular value of $B_i$, $\hat{s}_{i,j}$ refers to the jth singular value of $\hat{B}_i$, "$||$" is an absolute value sign, and $D_{occ}(m)$ refers to a median of $D_{occ}(1), D_{occ}(2), \ldots, D_{occ}(N_{occ})$;

④-2 calculating the singular value distances between the image blocks which are in all corresponding positions of $\hat{R}_{bs}^{h}$ and $R_{bs}^{h}$ and have the size of k×k, wherein an i'th binocular suppression block in $\hat{R}_{bs}^{h}$ is denoted as $\hat{B}_{i'}^{l}$, in $R_{bs}^{h}$ an i'th binocular suppression block in a corresponding position of $\hat{B}_{i'}^{l}$ is denoted as $B_{i'}^{l}$, a singular value distance between $\hat{B}_{i'}^{l}$ and $B_{i'}^{l}$ is calculated and is denoted as $D_{bs}^{l}(i')$, $$D_{bs}^{l}(i') = \sqrt{\sum_{j=1}^{k} (s_{i',j}^{l} - \hat{s}_{i',j}^{l})^2},$$

calculating the singular value distances between the image blocks which are in all corresponding positions of $\hat{R}_{bs}^{r}$ and $R_{bs}^{r}$ and have the size of k×k, wherein an i'th binocular suppression block in $\hat{R}_{bs}^{r}$ is denoted as $\hat{B}_{i'}^{r}$, in $R_{bs}^{r}$ an i'th binocular suppression block in a corresponding position of $\hat{B}_{i'}^{r}$ is denoted as $B_{i'}^{r}$, a singular value distance between $\hat{B}_{i'}^{r}$ and $B_{i'}^{r}$ is calculated and is denoted as $D_{bs}^{r}(i')$, $$D_{bs}^{r}(i') = \sqrt{\sum_{j=1}^{k} (s_{i',j}^{r} - \hat{s}_{i',j}^{r})^2},$$

calculating the singular value distances of all of the binocular suppression blocks in $\hat{R}_{bs}'$, wherein an i'th binocular suppression block in $\hat{R}_{bs}{}^l$ is denoted as $\hat{B}_{i'}$, and singular value distance thereof is calculated and denoted as $D_{bs}(i')$, $D_{bs}(i')=\min\{D_{bs}{}^l(i'), D_{bs}{}^r(i')\}$, and calculating the singular value distances corresponding to all of the binocular suppression blocks in $\hat{R}_{bs}{}^l$ as the overall distortion degree of $\hat{R}_{bs}{}^l$, which is denoted as $Q_{bs}$, wherein $$Q_{bs} = \frac{1}{N_{bs}}\sum_{i'=1}^{N_{bs}} |D_{bs}(i') - D_{bs}(m)|,$$

wherein $1 \leq i' \leq N_{bs}$, $N_{bs}$ refers to a number of all of the binocular suppression blocks in $\hat{R}_{bs}{}^h$ or $\hat{R}_{bs}{}^n$, $1 \leq j \leq k$, k refers to a number of singular values in one of the image blocks, $s_{i',j}{}^l$ refers to a jth singular value of $B_i{}^l$, $\hat{s}_{i',j}{}^l$ refers to the jth singular value of $\hat{B}_i{}^l$, $s_{i',j}{}^r$ refers to a jth singular value of $B_i{}^r$, $\hat{s}_{i',j}{}^r$ refers to a jth singular value of $\hat{B}_i{}^r$, min ( ) is a sign for a minimum value, "||" is an absolute value sign, and $D_{bs}(m)$ refers to a median of $D_{bs}(1), D_{bs}(2), \ldots, D_{bs}(N_{bs})$; and ④-3 calculating the singular value distances between the image blocks which are in all corresponding positions of $\hat{R}_{bf}{}^h$ and $R_{bf}{}^h$ and have the size of k×k, wherein an i'th binocular fusion block in $\hat{R}_{bf}{}^h$ is denoted as $\hat{B}_{i''}{}^l$, in $R_{bf}{}^h$ an i'th binocular fusion block in a corresponding position of $\hat{B}_{i''}{}^l$ is denoted as $B_{i''}{}^l$, a singular value distance between $\hat{B}_{i''}{}^l$ and $B_{i''}{}^l$ is calculated and is denoted as $D_{bf}{}^l(i'')$ $$D_{bf}^l(i'') = \sqrt{\sum_{j=1}^{k} \left(s_{i'',j}^l - \hat{s}_{i'',j}^l\right)^2},$$

calculating the singular value distances between the image blocks which are in all corresponding positions of $\hat{R}_{bf}{}^n$ and $R_{bf}{}^n$ and have the size of k×k, wherein an i''th binocular fusion block in $\hat{R}_{bf}{}^n$ is denoted as $\hat{B}_{i''}{}^r$, in $R_{bf}{}^n$ an i''th binocular fusion block in a corresponding position of $\hat{B}_{i''}{}^r$ is denoted as $B_{i''}{}^r$, a singular value distance between $\hat{B}_{i''}{}^r$, and $B_{i''}{}^l$ is calculated and is denoted as $D_{bf}{}^r(i'')$, $$D_{bf}^r(i'') = \sqrt{\sum_{j=1}^{k} (s_{i'',j}^r - \hat{s}_{i'',j}^r)^2},$$

calculating the singular value distances of all of the binocular fusion blocks in $\hat{R}_{bf}{}^h$ for serving as an overall distortion degree of $\hat{R}_{bf}{}^h$, which is denoted as $Q_{bf}{}^l$, $$Q_{bf}^l = \frac{1}{N_{bf}}\sum_{i''=1}^{N_{bf}} |D_{bf}^l(i'') - D_{bf}^l(m)|,$$

calculating the singular value distances of all of the binocular fusion blocks in $\hat{R}_{bf}{}^n$ for serving as an overall distortion degree of $\hat{R}_{bf}{}^n$, which is denoted as $Q_{bf}{}^r$, $$Q_{bf}^r = \frac{1}{N_{bf}}\sum_{i''=1}^{N_{bf}} |D_{bf}^r(i'') - D_{bf}^r(m)|,$$

and calculating an overall distortion degree of $\hat{R}_{bf}{}^l$ according to $Q_{bf}{}^l$ and $Q_{bf}{}^r$, which is denoted as $Q_{bf}$, $Q_{bf}=0.7\times(Q_{bf}{}^l+Q_{bf}{}^r)$, wherein $1 \leq i'' \leq N_{bf}$, $N_{bf}$ refers to a number of all of the binocular fusion blocks in $\hat{R}_{bf}{}^h$ or $\hat{R}_{bf}{}^n$, $1 \leq j \leq k$, k refers to a number of singular values in one of the image blocks, $s_{i'',j}{}^l$ refers to a j th singular value of $B_i{}^l$, $\hat{s}_{i'',j}{}^l$ refers to the jth singular value of $\hat{B}_{i''}{}^l$, $s_{i'',j}{}^r$ refers to a j th singular value of $\hat{B}_{i''}{}^r$, $s_{i'',j}{}^r$ refers to a j th singular value of $\hat{B}_{i''}{}^r$, "||" is an absolute value sign, and $D_{bf}{}^l(m)$ refers to a median of $D_{bf}{}^l(1)$, $D_{bf}{}^l(2), \ldots, D_{bf}{}^l(N_{bf})$, $D_{bf}{}^r(m)$ refers to a median of $D_{bf}{}^r(1)$, $D_{bf}{}^r(2), \ldots, D_{bf}{}^r(N_{bf})$;

wherein in the step ⑤, a=0, b=0.5, c=0.5.

Compared with the prior art, advantage of the present invention lies in obtaining the cyclopean image of the stereo image formed in the human visual system by simulating the process that the human visual system deals with the stereo image, wherein the cyclopean image comprises three areas: the occlusion area, the binocular fusion area and the binocular suppression area. Representing characteristics of the image according to the singular value of the image has a strong stability. According characteristics of different areas of the human visual system while dealing with the cyclopean image, the distortion degree of the cyclopean image corresponding to the testing stereo image is presented by the singular value distance between cyclopean images respectively corresponding to the testing stereo image and the reference stereo image, in such a manner that an overall visual quality of the testing stereo image is finally evaluated. The method for objectively evaluating quality of the stereo image of the present invention is capable of objectively reflecting visual quality variations of the stereo image under influence of various image processing or suppressing methods. Furthermore, evaluation performance of the method of the present invention is not influenced by contents and distortion types of the stereo image, and is in accordance with subjective visual perception of human eyes.

These and other objectives, features, and advantages of the present invention will become apparent from the following detailed description, the accompanying drawings, and the appended claims.

DETAILED DESCRIPTION OF THE PREFERRED EMBODIMENT

Combined with the accompanying drawings and the preferred embodiment, further and detailed description of the present invention is illustrated as following.

Studies of human visual physiology show that an ocular distance of human beings is about 60~65 mm. The distance causes that two eyes are in a slightly different location and angle while watching a certain scene, which further causes that the scene has slightly different images formed between retinal of the two eyes. However, in practice, people having normal vision do not feel that the two images formed in the two eyes are overlapped while watching the scene. Image formed in human brain is a stereo cyclopean image, i.e., single-eyed view image. This phenomenon is a result of binocular fusion and binocular suppression processed by human visual system. In the human visual system, due to existing of a Panum area, the binocular fusion is occurred, areas respectively corresponding to retinal of left eye and right eye are not necessary to accurately locate at a same position, and a slight disparity is allowed thereof. However, if great content difference or great disparity is existed between images respectively corresponding to retinal of the left eye and the right eye, the human visual system is not capable of processing the binocular fusion on conflict information of two eyes. Then phenomenon of diplopia or binocular visual confusion appears, and a binocular rivalry status starts. However, the normal human visual system can not endure the binocular rivalry status for a long time, and the binocular rivalry status is finally transferred to a status of binocular suppression processing. Two situations may occur in the binocular suppression processing:

if contents of the images in the areas respectively corresponding to the retinal of the left eye and the right eye have great differences, information of the retinal of the left eye and the right eye will intermittently suppress an opposite side in turn, i.e., in the areas respectively corresponding to the retinal of the left eye and the right eye, image information of the retinal of the left eye and the right eye is intermittently shown in turn; and if contents of the images in the areas respectively corresponding to the retinal of the left eye and the right eye are relatively similar but have great disparity therebetween, in the area, information of one eye on the retinal of the left eye or the right eye will enduringly suppress thereof the other eye. Usually, the image having a more clear contour in one eye suppresses thereof the other eye.

Figure 1:
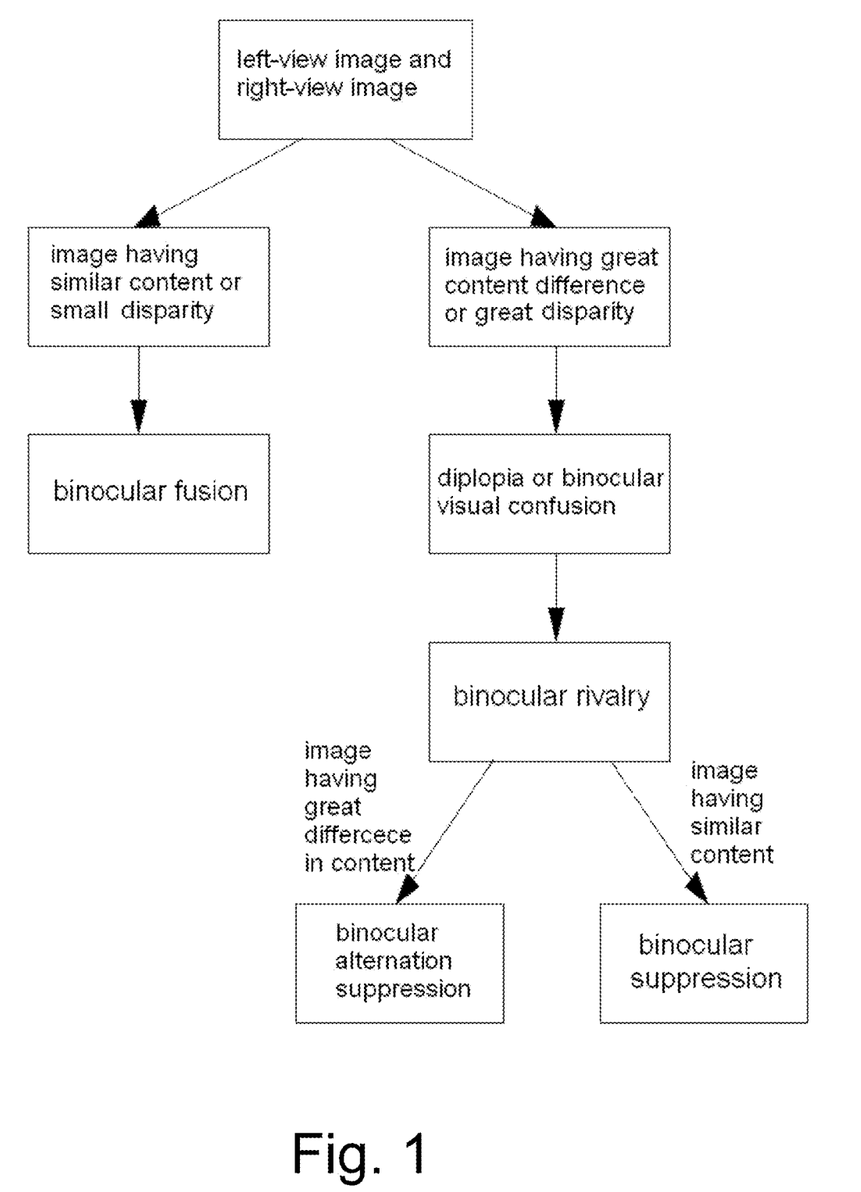
FIG. 1 shows a process of binocular fusion and binocular suppression in human visual system.

A process of the binocular fusion and the binocular suppression in the human visual system is shown as in FIG. 1 of the drawings.

According to characteristic of binocular stereo vision in human visual system, the present invention provides a method for objectively evaluating quality of a stereo image based on the binocular fusion and the binocular suppression. The method for objectively evaluating quality of the stereo image of the present invention firstly simulates a process that the human visual system treats the stereo image, so as to obtain the cyclopean image formed in human brain by the stereo image, then processes mathematical modeling on the cyclopean image, evaluates distortion degree of the cyclopean image by a full reference quality evaluation method, in such a manner that overall visual quality of the stereo image is finally obtained.

Figure 2:
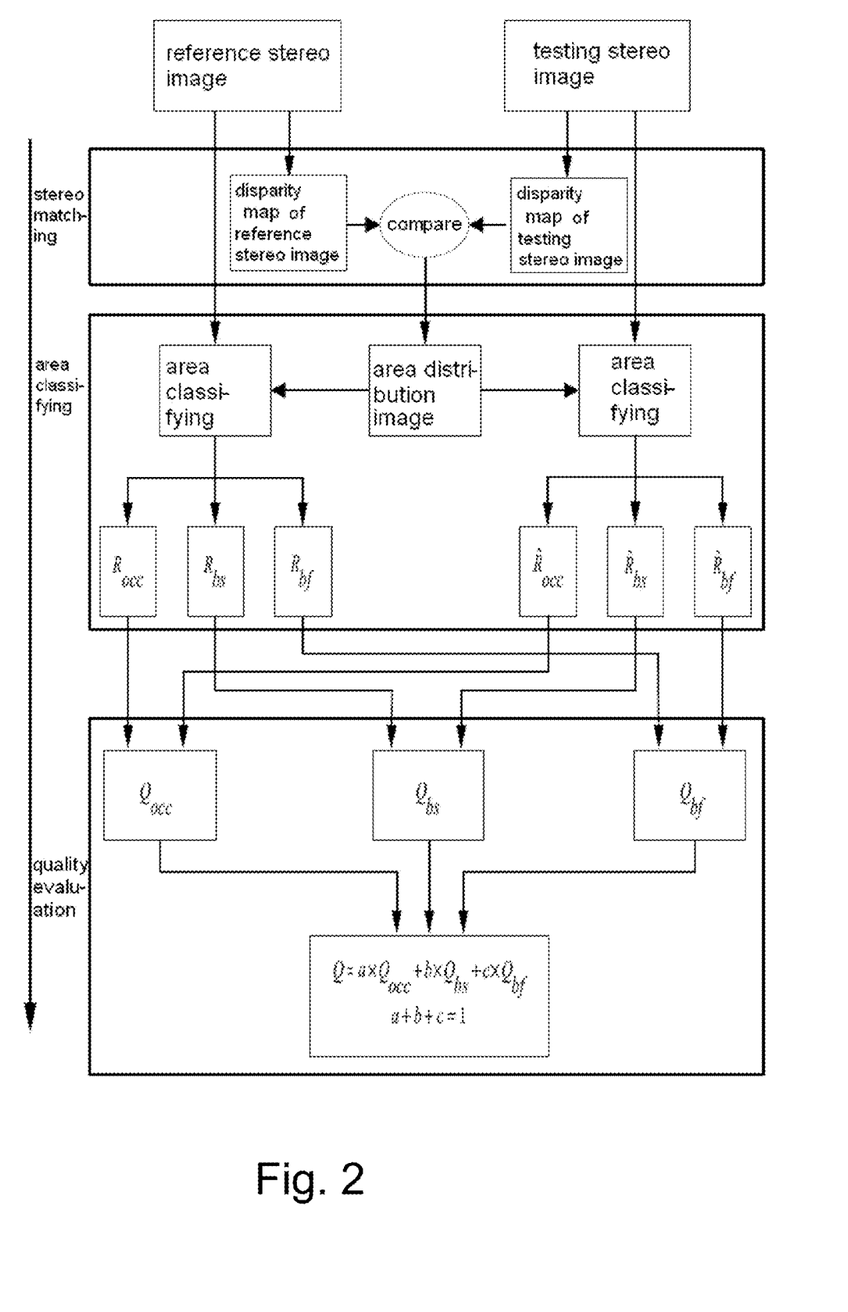
FIG. 2 is a flow block diagram of a method for objectively evaluating quality of a stereo image according to a preferred embodiment of the present invention.

As shown in FIG. 2 which is an overall flow block diagram, the present invention provides a method for objectively evaluating quality of a stereo image based on binocular fusion and binocular suppression, comprising steps as following.

①Defining an original stereo image which is utilized for referring in an objective quality evaluation of the stereo image as a reference stereo image, a left-view of the reference stereo image is denoted as $I_l$, a right-view of the reference stereo image is denoted as $I_r$, a cyclopean image of the reference stereo image formed in a human visual system is denoted as C.

Defining a distortion image of the reference stereo image which is used for testing in the objective quality evaluation of the stereo image as a testing stereo image, a left-view of the testing stereo image is denoted as $\hat{I}_l$, a right-view of the testing stereo image is denoted as $\hat{I}_r$, a cyclopean image of the testing stereo image formed in the human visual system is denoted as $\hat{C}$, wherein sizes of the left-view of the reference stereo image $I_l$, the right-view of the reference stereo image $I_r$, the left-view of the testing stereo image $\hat{I}_l$, and the right-view of the testing stereo image $\hat{I}_r$ are all denoted as W×H, wherein W refers to a width thereof, and H refers to a height thereof.

②According to characteristics of the human visual system processing stereo image, classifying the cyclopean image $\hat{C}$ of the testing stereo image formed in the human visual system into three areas.

A first area thereof is an occlusion area, which is denoted as $\hat{R}_{occ}$, information of the occlusion area $\hat{R}_{occ}$ exists only in the left-view or the right-view of the testing stereo image.

A second area thereof is a binocular suppression area, which is denoted as $\hat{R}_{bs}$, information of the binocular suppression area $\hat{R}_{bs}$ is binocular information having great image content difference or great disparity between the left-view and the right-view of the testing stereo image, i.e., the binocular suppression area is an area produced by binocular suppression processing of the human visual system, in which the corresponding image contents in the left-view and right-view of the stereo image have great difference or great disparities.

A third area thereof is a binocular fusion area, which is denoted as $\hat{R}_{bf}$, information of the binocular fusion area $\hat{R}_{bf}$ is binocular information having similar image content and small disparity between the left-view and the right-view of the testing stereo image, i.e. the binocular fusion area is an area produced by binocular fusion processing of the human visual system, in which the corresponding image contents in the left-view and right-view of the stereo image are similar with each other and the corresponding disparities thereof are small.

In this preferred embodiment, a specific process of the step ② mentioned above comprises:

②-1 Denoting a pixel having a position coordinate of (x,y) in the left-view image $I_l$ of the reference stereo image as $p_{x,y}^l$, denoting a pixel having a position coordinate of (s,t) in the right-view image $I_r$ of the reference stereo image as $p_{s,t}^r$, denoting a pixel having a position coordinate of (x,y) in the left-view image $\hat{I}_l$ of the testing stereo image as $\hat{p}_{x,y}^l$, and denoting a pixel having a position coordinate of (s,t) in the right-view image $\hat{I}_r$ of the testing stereo image as $\hat{p}_{s,t}^r$, wherein 1≤x≤W, 1≤y≤H, 1≤s≤W and 1≤t≤H.

②-2 Processing stereo matching on the reference stereo image, so as to obtain a horizontal disparity and a vertical disparity of each pixel of the reference stereo image, wherein a specific process thereof comprises:

judging whether $p_{x,y}^l$ is matched with $p_{s,t}^r$, wherein:

if $p_{x,y}^l$ is matched with $p_{s,t}^r$, matching relationship of $p_{x,y}^l$ and $p_{s,t}^r$ is presented as $(p_{x,y}^l, p_{s,t}^r)$, the horizontal disparities of $p_{x,y}^l$ and $p_{s,t}^r$ are both denoted as $d_{x,y}^h$, wherein $d_{x,y}^h=|s-x|$, the vertical disparities of $p_{x,y}^l$ and $p_{s,t}^r$ are both denoted as $d_{x,y}^v$, wherein $d_{x,y}^v=|t-y|$, if no pixel is matched with $p_{x,y}^l$ in the right-view $I_r$ of the reference stereo image, matching relationship of $p_{x,y}^l$ is presented as $(p_{x,y}^l, \phi)$, and the horizontal disparity and the vertical disparity of $p_{x,y}^l$ are both determined to be 255, and if no pixel is matched with $p_{s,t}^r$ in the left-view image $I_l$ of the reference stereo image, matching relationship of $p_{s,t}^r$ is presented as $(\phi, p_{s,t}^r)$, and the horizontal disparity and the vertical disparity of $p_{s,t}^r$ are both determined to be 255, wherein "||" is an absolute value sign, "φ" is an empty set sign.

②-3 Processing stereo matching on the testing stereo image, so as to obtain a horizontal disparity and a vertical disparity of each pixel of the testing stereo image, wherein a specific process thereof comprising:

judging whether $\hat{p}_{x,y}{}^l$ is matched with $\hat{p}_{s,t}{}^r$, wherein:

if $\hat{p}_{x,y}{}^l$ is matched with $\hat{p}_{s,t}{}^r$ matching relationship of $\hat{p}_{x,y}{}^l$ and $\hat{p}_{s,t}{}^r$ is presented as $(\hat{p}_{x,y}{}^l, \hat{p}_{s,t}{}^r)$ the horizontal disparities of $\hat{p}_{x,y}{}^l$ and $\hat{p}_{s,t}{}^r$ are both denoted as $d_{x,y}{}^h$, wherein a $d_{x,y}{}^h = |s-x|$, the vertical disparities of $\hat{p}_{x,y}{}^l$ and $\hat{p}_{s,t}{}^r$ are both denoted as $d_{x,y}{}^v$, wherein $d_{x,y}{}^v = |t-y|$, if no pixel is matched with $\hat{p}_{x,y}{}^l$ in the right-view $\hat{I}_r$ of the testing stereo image, matching relationship of $\hat{p}_{x,y}{}^l$ is presented as $(\hat{p}_{x,y}{}^l, \phi)$, and the horizontal disparity and the vertical disparity of $\hat{p}_{x,y}{}^l$ are both determined to be 255, and if no pixel is matched with $\hat{p}_{s,t}{}^r$, in the left-view $\hat{I}_l$ of the testing stereo image, matching relationship of $\hat{p}_{s,t}{}^r$ is presented as $(\phi, \hat{p}_{s,t}{}^r)$, and the horizontal disparity and the vertical disparity of $\hat{p}_{s,t}{}^r$ are both determined to be 255, wherein "||" is an absolute value sign, "$\phi$" is an empty set sign.

②-4 After stereo matching, according to characteristics of the human visual system processing stereo image, dividing the cyclopean image of the testing stereo image formed in the human visual system $\hat{C}$ into an occlusion area $\hat{R}_{occ}$ and a match area $\hat{R}_{match}$, the occlusion area $\hat{R}_{occ}$ is a set of pixels of the left-view and right-view of the testing stereo image which fail to match themselves in another view of the testing stereo image, thus the occlusion area $\hat{R}_{occ}$ comprises a left-view occlusion area $\hat{R}_{occ}{}^l$ and a right-view occlusion area $\hat{R}_{occ}{}^r$, wherein $\hat{R}_{occ} = \hat{R}_{occ}{}^l \cup \hat{R}_{occ}{}^r$, wherein the left-view occlusion area $\hat{R}_{occ}{}^l$ is a set of pixels having a matching relationship of $(\hat{p}_{x,y}{}^l, \phi)$ in the left-view $\hat{I}_l$ of the testing stereo image, which are presented as $\hat{R}_{occ}{}^l = \{\hat{p}_{x,y}{}^l | (\hat{p}_{x,y}{}^l, \phi) \wedge \hat{p}_{x,y}{}^l \in \hat{I}_l\}$, the right-view occlusion area $\hat{R}_{occ}{}^r$ is a set of pixels having a matching relationship of $(\phi, \hat{p}_{s,t}{}^r)$ in the right-view $\hat{I}_r$ of the testing stereo image, which is presented as $\hat{R}_{occ}{}^r = \{\hat{p}_{s,t}{}^r | (\phi, \hat{p}_{s,t}{}^r) \wedge \hat{p}_{s,t}{}^r \in \hat{I}_r\}$, the match area $\hat{R}_{match}$ is a set of matched pixels of the left-view $\hat{I}_l$ of the testing stereo image and the right-view $\hat{I}_r$ of the testing stereo image, which having a matching relationship of $(\hat{p}_{x,y}{}^l, \hat{p}_{s,t}{}^r)$, wherein "$\cup$" is an operational sign of a union, "$\wedge$" is an operational sign of "and".

②-5 Further dividing the match area $\hat{R}_{match}$ into a binocular suppression area $\hat{R}_{bs}$ and a binocular fusion area $\hat{R}_{bf}$.

Binocular suppression area $\hat{R}_{bs}$ is an area of which the disparity between the left-view and right-view of the original stereo image becomes larger after distortion process. The binocular suppression area $\hat{R}_{bs}$ is an integrated area formed by processing binocular suppression on the left-view corresponding area $\hat{R}_{bs}{}^l$ of $\hat{R}_{bs}$ and the right-view corresponding area $\hat{R}_{bs}{}^r$ of $\hat{R}_{bs}$, that is, $\hat{R}_{bs} = \text{Sup}(\hat{R}_{bs}{}^l, \hat{R}_{bs}{}^r)$, Sup( ) denotes binocular suppression processing of the human visual system, which shows that the information of a view with relatively good quality suppresses the information of another view with relatively poor quality, and $$\hat{R}_{bs}{}^l = \{\hat{p}_{x,y}{}^l | \hat{p}_{x,y}{}^l \in \hat{I}_l \wedge \hat{p}_{s,t}{}^r \in \hat{I}_r \wedge (\hat{p}_{x,y}{}^l, \hat{p}_{s,t}{}^r) \wedge |\hat{d}_{x,y}{}^h| + |\hat{d}_{x,y}{}^v| > |d_{x,y}{}^h| + |d_{x,y}{}^v|\},$$

$$\hat{R}_{bs}{}^r = \{\hat{p}_{s,t}{}^r | \hat{p}_{s,t}{}^r \in \hat{I}_l \wedge \hat{p}_{s,t}{}^r \in \hat{I}_r \wedge (\hat{p}_{x,y}{}^l, \hat{p}_{s,t}{}^r) \wedge |\hat{d}_{x,y}{}^h| + |\hat{d}_{x,y}{}^v| > |d_{x,y}{}^h| + |d_{x,y}{}^v|\}.$$

Binocular fusion area $\hat{R}_{bf}$ is an area of which the disparity between the left-view and right-view of the original stereo image is not changed or becomes smaller after distortion process. The binocular fusion area $\hat{R}_{bf}$ is an integrated area formed by processing binocular fusion on the left-view corresponding area $\hat{R}_{bf}{}^l$ of $\hat{R}_{bf}$ and the right-view corresponding view $\hat{R}_{bf}{}^r$ of $\hat{R}_{bf}$, that is, $\hat{R}_{bf} = \text{Fus}\{\hat{R}_{bf}{}^l, \hat{R}_{bf}{}^r\}$, Fus( ) denotes binocular fusion processing and binocular superposition processing of human visual system, and $$\hat{R}_{bf}{}^l = \{\hat{p}_{x,y}{}^l | \hat{p}_{x,y}{}^l \in \hat{I}_l \wedge \hat{p}_{s,t}{}^r \in \hat{I}_r \wedge (\hat{p}_{x,y}{}^l, \hat{p}_{s,t}{}^r) \wedge |\hat{d}_{x,y}{}^h| + |\hat{d}_{x,y}{}^v| \leq |d_{x,y}{}^h| + |d_{x,y}{}^v|\},$$

$$\hat{R}_{bf}{}^r = \{\hat{p}_{s,t}{}^r | \hat{p}_{x,y}{}^l \in \hat{I}_l \wedge \hat{p}_{s,t}{}^r \in \hat{I}_r \wedge (\hat{p}_{x,y}{}^l, \hat{p}_{s,t}{}^r) \wedge |\hat{d}_{x,y}{}^h| + |\hat{d}_{x,y}{}^v| > |d_{x,y}{}^h| + |d_{x,y}{}^v|\}.$$

Figure 3:
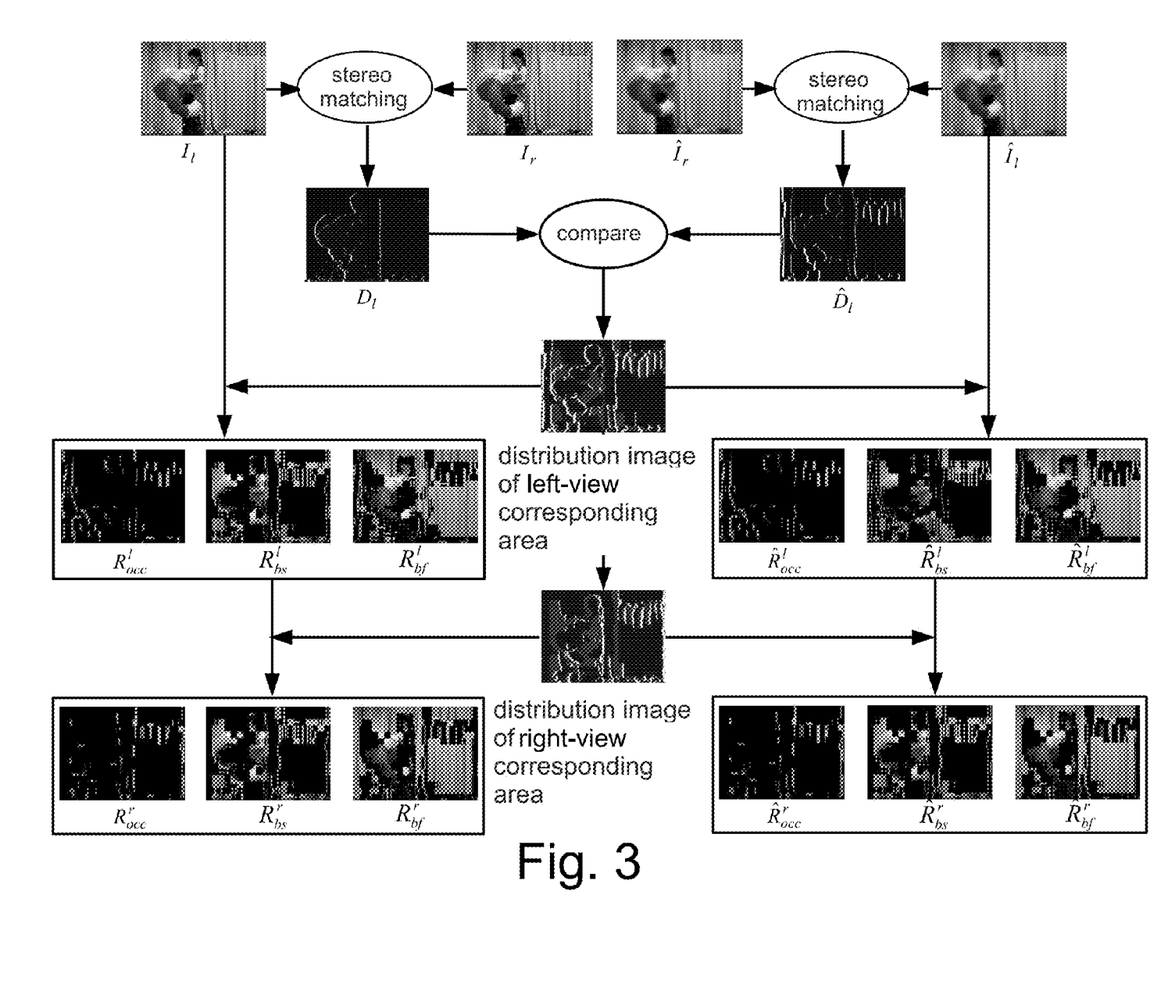
FIG. 3 is a sketch view of an area classifying result of Akko & Kayo.

FIG. 3 shows a sketch view of an area classifying result of Akko & Kayo. The original stereo image Akko & Kayo is used as the reference stereo image in this embodiment, and the corresponding testing stereo image is distorted by Gaussian blurring. PSNR of the left-view of the testing stereo image is 24.450 dB, and PSNR of the right-view of the testing stereo image is 23.862 dB.

In this embodiment, the stereo matching of a reference stereo image or a testing stereo image is implemented with a pixel-based software of MATCH v3.3 provided by Cornell University.

③ Dividing the cyclopean image $\hat{C}$ of the testing stereo image formed in the human visual system into a plurality of image blocks which are non-overlapped with each other and have a size of k×k, classifying all of the image blocks into three types: an occlusion block, a binocular suppression block and a binocular fusion block, updating $\hat{R}_{occ}$, $\hat{R}_{bs}$ and $\hat{R}_{bf}$ according to types of the image blocks, so as to obtain an updated occlusion area $\hat{R}_{occ}{}'$, an updated binocular suppression area $\hat{R}_{bs}{}'$ and an updated binocular fusion area $\hat{R}_{bf}{}'$, in the cyclopean image C of the reference stereo image formed in the human visual system, obtaining an area $R_{occ}{}'$ corresponding to a position of $\hat{R}_{occ}{}'$, an area $R_{bs}{}'$ corresponding to a position of $\hat{R}_{bs}{}'$, and an area $R_{bf}{}'$ corresponding to a position of $\hat{R}_{bf}{}'$;

processing singular value decomposition respectively on all of the image blocks having a size of k×k in the area $\hat{R}_{occ}{}'$, an area $\hat{R}_{bs}{}^{lh}$ corresponding to left-view of $\hat{R}_{bs}{}'$, an area $\hat{R}_{bs}{}^{rh}$ corresponding to right-view of $\hat{R}_{bs}{}'$, an area $\hat{R}_{bf}{}^{lh}$ corresponding to left-view of $\hat{R}_{bf}{}'$, an area $\hat{R}_{bf}{}^{rh}$ corresponding to right-view of $\hat{R}_{bf}{}'$, the area $R_{occ}{}'$, an area $R_{bs}{}^{lh}$ corresponding to left-view of $R_{bs}{}'$, an area $R_{bs}{}^{rh}$ corresponding to right-view of $R_{bs}{}'$, an area $R_{bf}{}^{lh}$ corresponding to left-view of $R_{bf}{}'$, and an area $R_{bf}{}^{rh}$ corresponding to right-view of $R_{bf}{}'$, in such a manner that singular values respectively corresponding to each image block are obtained, wherein k>1.

A specific process of the step ③ mentioned above comprises:

③-1 dividing the cyclopean image $\hat{C}$ of the testing stereo image formed in the human visual system into a plurality of image blocks which are non-overlapped with each other and have a size of k×k, classifying all of the image blocks of the cyclopean image $\hat{C}$ of the testing stereo image formed in the human visual system into three types: an occlusion block, a binocular suppression block and a binocular fusion block, wherein specific process of the classifying comprises:

denoting any one of the image blocks of the cyclopean image $\hat{C}$ of the testing stereo image formed in the human visual system as $\hat{B}$, and judging whether there is a pixel belonging to $\hat{R}_{occ}$ in the $\hat{B}$, wherein if yes, mark $\hat{B}$ as a occlusion block; if no, further judge whether there is a pixel belonging to $\hat{R}_{bs}$ in $\hat{B}$, if yes, mark $\hat{B}$ as a binocular suppression block, if no mark $\hat{B}$ as a binocular fusion block, wherein k>1, and in this embodiment k=4;

③-2 defining an area constituted by all of the occlusion blocks of the cyclopean image $\hat{C}$ of the testing stereo image formed in the human visual system as an updated occlusion area, which is denoted as $\hat{R}_{occ}'$, defining an area constituted by all of the binocular suppression blocks of the cyclopean image $\hat{C}$ of the testing stereo image formed in the human visual system as an updated binocular suppression area, which is denoted as $\hat{R}_{bs}'$, and defining an area constituted by all of the binocular fusion blocks of the cyclopean image $\hat{C}$ of the testing stereo image formed in the human visual system as an updated binocular fusion area, which is denoted as $\hat{R}_{bf}'$, wherein the left-view corresponding area of the updated occlusion area $\hat{R}_{occ}'$ is denoted as $\hat{R}_{occ}'^h$, the right-view corresponding area of $\hat{R}_{occ}'$ is denoted as $\hat{R}_{occ}'^n$, the left-view corresponding area of the updated binocular suppression area $\hat{R}_{bs}'$ is denoted as $\hat{R}_{bs}'^h$, the right-view corresponding area of $\hat{R}_{bs}'$ is denoted as $\hat{R}_{bs}'^n$, the left-view corresponding area of the updated binocular fusion area $\hat{R}_{bf}'$ is denoted as $\hat{R}_{bf}'^h$, and the right-view corresponding area of $\hat{R}_{bf}'$ is denoted as $\hat{R}_{bf}'^n$;

③-3 denoting the area corresponding to the position of $\hat{R}_{occ}$ in the cyclopean image C of the reference stereo image formed in the human visual system as $R_{occ}'$, wherein $R_{occ}' = R_{occ}'^h \cup R_{occ}'^n$, wherein "$\cup$" is an operational sign for union in a set, wherein $R_{occ}'^h$ is the area corresponding to the position of $\hat{R}_{occ}'^h$ in the cyclopean image C of the reference stereo image formed in the human visual system, $R_{occ}'^h = \{p_{x,y}^l | p_{x,y}^l \in I_l \wedge \hat{p}_{x,y}^l \in \hat{R}_{occ}'^h\}$, wherein $R_{occ}'^n$ is the area corresponding to the position of $\hat{R}_{occ}'^n$ in the cyclopean image C of the reference stereo image formed in the human visual system, $R_{occ}'^n = \{p_{s,t}^r | p_{s,t}^r \in I_r \wedge \hat{p}_{s,t}^r \in \hat{R}_{occ}'^n\}$, ③-4 denoting the area corresponding to the position of $\hat{R}_{bs}'^h$ in the cyclopean image C of the reference stereo image formed in the human visual system as $R_{bs}'^l$, wherein $R_{bs}'^h = \{p_{x,y}^l | p_{x,y}^l \in I_l \wedge \hat{p}_{x,y}^l \in \hat{R}_{bs}'^h\}$, an denoting the area corresponding to the position of $\hat{R}_{b,s}'^n$ in the cyclopean image C of the reference stereo image formed in the human visual system as $R_{bs}'^n$, wherein $R_{bs}'^n = \{p_{s,t}^r | p_{s,t}^r \in I_r \wedge \hat{p}_{s,t}^r \in \hat{R}_{bs}'^n\}$;

③-5 denoting the area corresponding to the position of $\hat{R}_{bf}'^h$ in the cyclopean image C of the reference stereo image formed in the human visual system as $R_{bf}'^h$, wherein $R_{bf}'^h = \{p_{x,y}^l | p_{x,y}^l \in I_l \wedge \hat{p}_{x,y}^l \in \hat{R}_{bf}'^h\}$, and denoting the area corresponding to the position of $\hat{R}_{bf}'^n$ in the cyclopean image C of the reference stereo image formed in the human visual system as $R_{bf}'^n$, wherein $R_{bf}'^n = \{p_{s,t}^r | p_{s,t}^r \in I_r \wedge \hat{p}_{s,t}^r \in \hat{R}_{bf}'^n\}$; and ③-6 processing the singular value decomposition respectively on all of the image blocks having the size of k×k in $\hat{R}_{occ}'$, $\hat{R}_{bs}'^h$, $\hat{R}_{bs}'^n$, $\hat{R}_{bf}'^h$, $\hat{R}_{bf}'^n$, $R_{occ}'$, $\hat{R}_{bs}'^h$, $R_{bs}'^n$, $\hat{R}_{bf}'^h$ and $\hat{R}_{bf}'^n$, in such a manner that the singular values respectively corresponding to all image blocks having the size of k×k and in $R_{occ}'$, $\hat{R}_{bs}'^h$, $\hat{R}_{bs}'^n$, $\hat{R}_{bf}'^h$, $\hat{R}_{bf}'^n$, $R_{occ}'$, $\hat{R}_{bs}'^h$, $R_{bs}'^n$, $R_{bf}'^h$ and $R_{bf}'^n$ are obtained. For an image block having a size of k×k, the singular value decomposition can be represented as matrix operation. Let G denote the image block, then the singular value decomposition can be represented as $G = USV^T$, wherein U and V are orthogonal matrices, S is a diagonal matrix, $S = \text{diag}(s_1, s_2, \ldots, s_k)$, and all of diagonal elements of S are called as singular value of G.

④ Obtaining an overall distortion degree $Q_{occ}$ of $\hat{R}_{occ}$ according to singular value distances between all of the image blocks which are in corresponding positions in $\hat{R}_{occ}'$ and $R_{occ}'$ and have a size of k×k, obtaining an overall distortion degree $Q_{bs}$ of $\hat{R}_{bs}'$ according to singular value distances between all of the image blocks which are in corresponding positions in $\hat{R}_{bs}'^h$ and $R_{bs}'^h$ and have a size of k×k, and singular value distances between all of the image blocks which are in corresponding positions in $\hat{R}_{bs}'^n$ and $R_{bs}'^n$ and have a size of k×k, and obtaining an overall distortion degree $Q_{bf}$ of $\hat{R}_{bf}'$ according to singular value distances between all of the image blocks which are in corresponding positions in $\hat{R}_{bf}'^h$ and $R_{bf}'^h$ and have a size of k×k, and singular value distances between all of the image blocks which are in corresponding positions of $\hat{R}_{bf}'^n$ and $R_{bf}'^n$ and have a size of k×k.

A specific process of the step ④ is as following.

④-1 Calculating the singular value distances between the image blocks which are in all corresponding positions of $\hat{R}_{occ}'$ and $R_{occ}'$ and have the size of k×k, wherein an ith occlusion block in $\hat{R}_{occ}'$ is denoted as $\hat{B}_i$, in $R_{occ}'$ an ith occlusion block in a corresponding position of $\hat{B}_i$ is denoted as $B_i$, a singular value distance between $\hat{B}_i$ and $B_i$ is calculated and is denoted as $D_{occ}(i)$, $$D_{occ}(i) = \sqrt{\sum_{j=1}^{k} (s_{i,j} - \hat{s}_{i,j})^2}.$$

Calculating the singular value distances corresponding to all of the occlusion blocks in $\hat{R}_{occ}'$ as the overall distortion degree of $\hat{R}_{occ}'$, which is denoted as $Q_{occ}$, wherein $$Q_{occ} = \frac{1}{N_{occ}} \sum_{i=1}^{N_{occ}} |D_{occ}(i) - D_{occ}(m)|,$$

wherein $1 \leq i \leq N_{occ}$, $N_{occ}$ refers to a number of all of the occlusion blocks in $\hat{R}_{occ}'$, and $N_{occ}$ is also a number of all of the occlusion blocks in $R_{occ}'$, $1 \leq j \leq k$ refers to a number of singular values in one of the image blocks, $s_{i,j}$ refers to a j th singular value of $B_i$, $\hat{S}_{i,j}$ refers to the jth singular value of $\hat{B}_i$, "|" is an absolute value sign, and $D_{occ}(m)$ refers to a median of $D_{occ}(1), D_{occ}(2), \ldots, D_{occ}(N_{occ})$.

④-2 Calculating the singular value distances between the image blocks which are in all corresponding positions of $\hat{R}_{bs}'^h$ and $R_{bs}'^h$ and have the size of k×k, wherein an i'th binocular suppression block in $\hat{R}_{bs}'^h$ is denoted as $\hat{B}_{i'}^l$, in $R_{bs}'^h$ an i'th binocular suppression block in a corresponding position of $\hat{B}_{i'}^l$ is denoted as $B_{i'}^l$, a singular value distance between $\hat{B}_{i'}^l$ and $B_{i'}^l$ is calculated and is denoted as $D_{bs}^l(i')$, $$D_{bs}^l(i') = \sqrt{\sum_{j=1}^{k} (s_{i',j}^l - \hat{s}_{i',j}^l)^2}.$$

Calculating the singular value distances between the image blocks which are in all corresponding positions of $\hat{R}_{bs}'^n$ and $R_{bs}'^n$ and have the size of k×k, wherein an i'th binocular suppression block in $\hat{R}_{bs}'^n$ is denoted as $\hat{B}_{i'}^r$, in $R_{bs}'^n$ an i'th binocular suppression block in a corresponding position of $\hat{B}_{i'}^r$ is denoted as $B_{i'}^r$, a singular value distance between $\hat{B}_{i'}^r$ and $B_{i'}^r$ is calculated and is denoted as $D_{bs}^r(i')$, $$D_{bs}^r(i') = \sqrt{\sum_{j=1}^{k} (s_{i',j}^r - \hat{s}_{i',j}^r)^2}.$$

Calculating the singular value distances of all of the binocular suppression blocks in $\hat{R}_{bs}'$, wherein an i'th binocular suppression block in $\hat{R}_{bs}'$ is denoted as $\hat{B}_{i'}$, and its singular value distance is calculated and denoted as $D_{bs}(i')$. Since usually the image having a more clear contour in one eye suppresses thereof the other eye in binocular suppression process of human visual system, and the singular value distance between a distorted stereo image and its original stereo image reflects the distortion degree of the distorted stereo image, which means that the larger the singular value distance is, the greater the distortion is, thus, the singular value distance $D_{bs}(i')$ of $\hat{B}_{i'}$ is determined by a smaller one of $D_{bs}^{l}(i')$ and $D_{bs}^{r}(i')$, that is, $D_{bs}(i')=\min\{D_{bs}^{l}(i'), D_{bs}^{r}(i')\}$.

Calculating the singular value distances corresponding to all of the binocular suppression blocks in $\hat{R}_{bs}'$ as the overall distortion degree of $\hat{R}_{bs}'$, which is denoted as $Q_{bs}$, wherein $$Q_{bs} = \frac{1}{N_{bs}} \sum_{i'=1}^{N_{bs}} |D_{bs}(i') - D_{bs}(m)|,$$

wherein $1 \leq i' \leq N_{bs}$, $N_{bs}$ refers to a number of all of the binocular suppression blocks in $\hat{R}_{bs}^{lh}$ or $\hat{R}_{b,s}^{lh}$, $1 \leq j \leq k$ refers to a number of singular values in one of the image blocks, $s_{i',j}^{l}$ refers to a jth singular value of $B_{i'}^{l}$, $\hat{s}_{i',j}^{l}$ refers to the jth singular value of $\hat{B}_{i'}^{l}$, $s_{i',j}^{r}$ refers to a jth singular value of $B_{i'}^{r}$, $\hat{s}_{i',j}^{r}$ refers to a jth singular value of $\hat{B}_{i'}^{r}$, min ( ) is a sign for a minimum value, "$||$" is an absolute value sign, and $D_{bs}(m)$ refers to a median of $D_{bs}(1), D_{bs}(2), \ldots, D_{bs}(N_{bs})$.

④-3 Calculating the singular value distances between the image blocks which are in all corresponding positions of $\hat{R}_{bf}^{lh}$ and $\hat{R}_{bf}^{lh}$ and have the size of k×k, wherein an i"th binocular fusion block in $\hat{R}_{bf}^{lh}$ is denoted as $\hat{B}_{i''}^{l}$ in $R_{bf}^{lh}$ an i"th binocular fusion block in a corresponding position of $\hat{B}_{i''}^{l}$, is denoted as $B_{i''}^{l}$, a singular value distance between $\hat{B}_{i''}^{l}$ and $B_{i''}^{l}$ is calculated and is denoted as $D_{bf}^{l}(i'')$, $$D_{bf}^{l}(i'') = \sqrt{\sum_{j=1}^{k} \left(s_{i'',j}^{l} - \hat{s}_{i'',j}^{l}\right)^2}.$$

Calculating the singular value distances between the image blocks which are in all corresponding positions of $\hat{R}_{bf}^{rh}$ and $\hat{R}_{bf}^{rh}$ and have the size of k×k, wherein an i"th binocular fusion block in $\hat{R}_{bf}^{rh}$ is denoted as $\hat{B}_{i''}^{r}$, in $R_{bf}^{rh}$ an i"th binocular fusion block in a corresponding position of $\hat{B}_{i''}^{r}$ is denoted as $B_{i''}^{r}$, a singular value distance between $\hat{B}_{i''}^{r}$ and $B_{i''}^{r}$ is calculated and is denoted as $D_{bf}^{r}(i'')$, $$D_{bf}^{r}(i'') = \sqrt{\sum_{j=1}^{k} \left(s_{i'',j}^{r} - \hat{s}_{i'',j}^{r}\right)^2}.$$

Calculating the singular value distances of all of the binocular fusion blocks in $\hat{R}_{bf}^{lh}$ for serving as an overall distortion degree of $\hat{R}_{bf}^{lh}$, which is denoted as $Q_{bf}^{l}$, $$Q_{bf}^{l} = \frac{1}{N_{bf}} \sum_{i''=1}^{N_{bf}} |D_{bf}^{l}(i'') - D_{bf}^{l}(m)|.$$

Calculating the singular value distances of all of the binocular fusion blocks in $\hat{R}_{bf}^{rh}$ for serving as an overall distortion degree of $\hat{R}_{bf}^{rh}$ which is denoted as $Q_{bf}^{r}$, $$Q_{bf}^{r} = \frac{1}{N_{bf}} \sum_{i''=1}^{N_{bf}} |D_{bf}^{r}(i'') - D_{bf}^{r}(m)|.$$

According to characteristic of binocular superposition processing of human visual system, the binocular sensitiveness is 1.4 times thereof the monocular. Therefore, an overall distortion degree of $\hat{R}_{bf}'$ is calculated and denoted as $Q_{bf}$ according to $Q_{bf}^{l}$ and $Q_{bf}^{r}$, $Q_{bf}=0.7\times(Q_{bf}^{l}+Q_{bf}^{r})$.

Here, $1 \leq i'' \leq N_{bf}$, $N_{bf}$ refers to a number of all of the binocular fusion blocks in $\hat{R}_{bf}^{lh}$ or $\hat{R}_{bf}^{rh}$, $1 \leq j \leq l$, k refers to a number of singular values in one of the image blocks, $s_{i'',j}^{l}$ refers to a j th singular value of $B_{i'}^{l}$, $s_{i'',j}^{l}$ refers to the jth singular value of $\hat{B}_{i'}^{l}$, $s_{i'',j}^{r}$ refers to a j th singular value of $B_{i'}^{r}$, $\hat{s}_{i'',j}^{r}$ refers to a j th singular value of $\hat{B}_{i'}^{r}$, "$||$" is an absolute value sign, and $D_{bf}^{l}(m)$ refers to a median of $D_{bf}^{l}(1), D_{bf}^{l}(2), \ldots, D_{bf}^{l}(N_{bf})$, $D_{bf}^{r}(m)$ refers to a median of $D_{bf}^{r}(1), D_{bf}^{r}(2), \ldots, D_{bf}^{r}(N_{bf})$.

⑤ Quality of the testing stereo image are influenced by distortions in the three areas including $\hat{R}_{occ}'$, $\hat{R}_{b}'$ and $\hat{R}_{bf}'$, and the distortions in the three areas are independent with each other. The present invention integrates the overall distortion degrees $Q_{occ}$, $Q_{bs}$ and $Q_{bf}$ with respect to the three areas according to their contributions to the overall visual quality of the testing stereo image, so as to obtain the overall distortion degree Q of the testing stereo image. According to the overall distortion degree $Q_{occ}$ of $\hat{R}_{occ}'$, the overall distortion degree $Q_{bs}$ of $\hat{R}_{bs}'$ and the overall distortion degree $Q_{bf}$ of $\hat{R}_{bf}'$, calculating an overall distortion degree Q of the testing stereo image by an equation of linear regression, wherein $Q=a\times Q_{occ}+b\times Q_{bs}+c\times Q_{bf}$, wherein a, b and c are all coefficients and satisfy:

$$\begin{cases} a+b+c=1 \\ 0 \leq a \leq 1 \\ 0 \leq b \leq 1 \\ 0 \leq c \leq 1. \end{cases}$$

In this embodiment, a=0, b=0.5, c=0.5.

Figure 4:
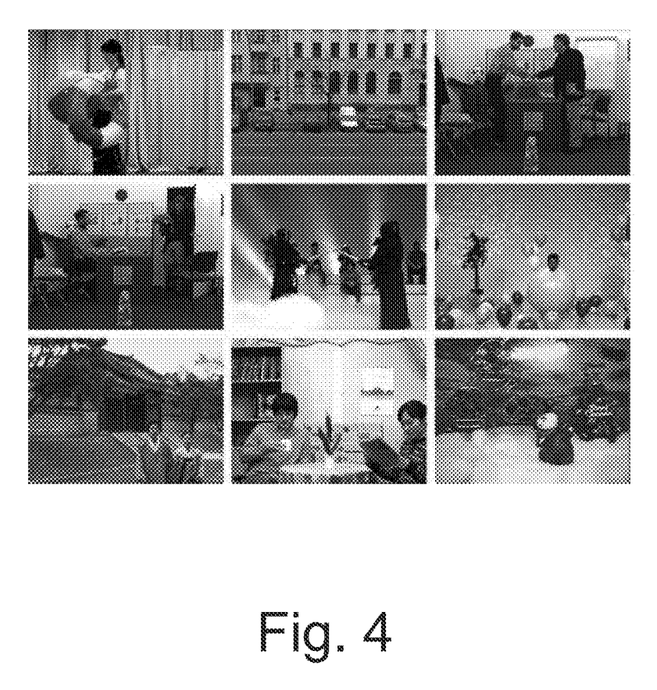
FIG. 4 is a testing stereo image utilized by the method according to a preferred embodiment of the present invention.

9 high-resolution color stereo images and corresponding distortion stereo images thereof are selected from testing sequences provided by Mobile3DTV for serving as testing database of the stereo image, so as to measure consistency between the method of the present invention and visual subjective perception of human beings. The testing database of the stereo image comprises the 9 high-resolution color stereo images which is shown in FIG. 4 of the drawings, and 234 distortion stereo images in total which comprise distortion stereo images of the 9 high-resolution color stereo images at 5 distortion levels by gaussian blur, distortion stereo images of the 9 high-definition color stereo images at 5 distortion levels by white Gaussian noise, distortion stereo images of the 9 high-definition color stereo images at 5 distortion levels by JPEG compression, distortion stereo images of the 9 high-definition color stereo images at 5 distortion levels by JPEG- 2000 compression, and distortion stereo images of the 9 high-definition color stereo images at 6 distortion levels by H.264 compression.

Figure 5:
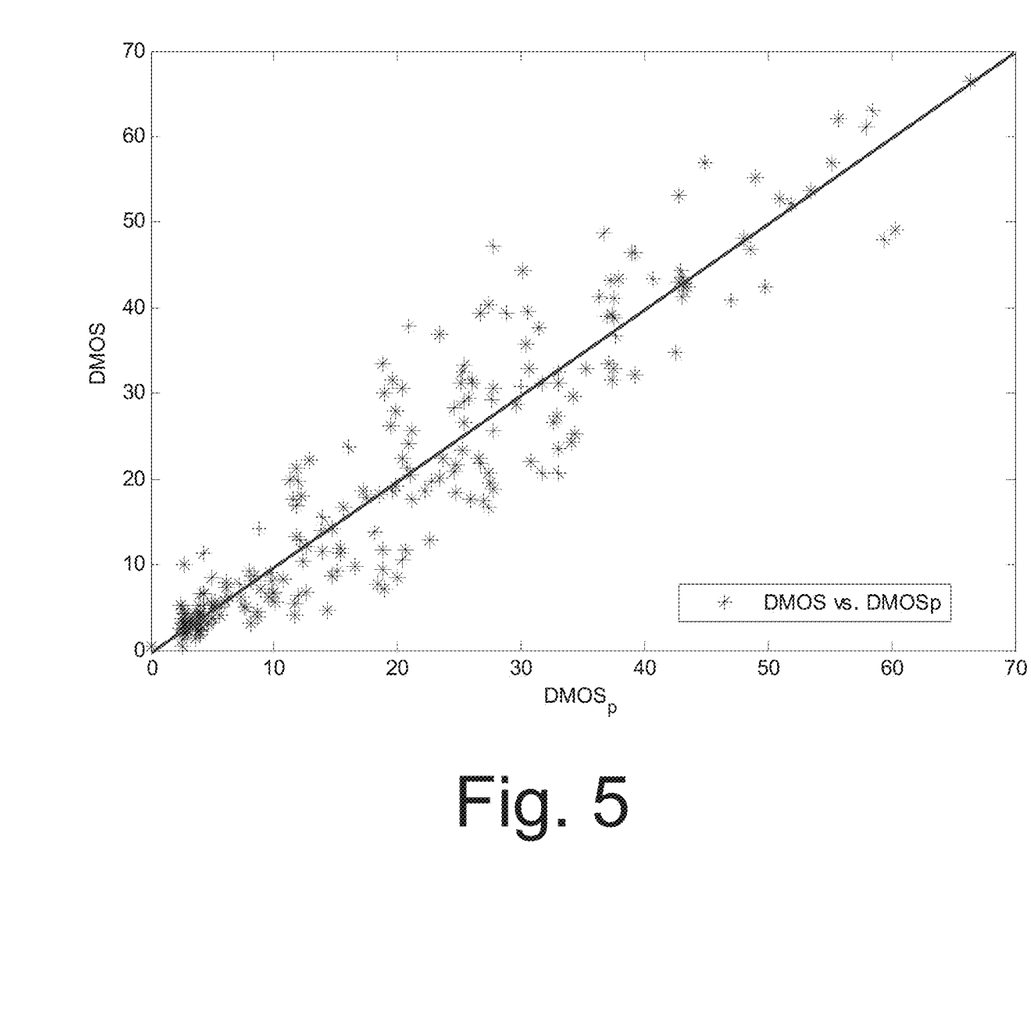
FIG. 5 is a scatter diagram of a subjective evaluation result and an evaluation result according to the method according to a preferred embodiment of the present invention.

FIG. 5 is a scatter diagram showing a subjective evaluation result DMOS of the 234 testing stereo images and a predicted value $DMOS_p$ thereof obtained by nonlinear processing on a result according to the method of the present invention. In the FIG. 5, the higher an intensity of data points are around a line y=x, the better the consistency is between the result according to the method of the present invention and the subjective evaluation result. In order to illustrate evaluation performance of the method of the present invention better, four performance indexes are utilized for evaluation according to testing standard of video quality evaluation group:

(1) Pearson linear correlation coefficient (CC), which is utilized for reflecting predication accuracy of an objective evaluation model;
(2) root-mean-square error (RMSE), which is often utilized for measuring accuracy of the objective evaluation model besides the Pearson linear correlation coefficient;
(3) Spearman rank correlation coefficient (SROCC), which is utilized for measuring monotonicity of the objective evaluation model; and
(4) obnormal value ratio (OR), which is utilized for reflecting dispersion degree of the objective evaluation model.

Table 1 lists evaluation results of 4 performance indexes according to the method of the present invention. It is known from data listed in Table 1. Evaluation result of the present invention has excellent accuracy, monotonicity and consistency, and thus is capable of predicting visual subjective perception of human beings to stereo images well.

TABLE 1

Evaluation result of the performance indexes according to the method of the present invention

|  | Gblur | JPEG | JP2K | Wn | H.264 | All data |
|---|---|---|---|---|---|---|
| Pearson linear correlation coefficient (CC) | 0.965 | 0.949 | 0.928 | 0.968 | 0.964 | 0.938 |
| Spearman rank correlation coefficient (SROCC) | 0.952 | 0.950 | 0.934 | 0.941 | 0.957 | 0.939 |
| root-mean-square error (RMSE) | 5.209 | 4.388 | 4.169 | 3.764 | 3.230 | 5.606 |
| obnormal value ratio (OR) | 0 | 0 | 0 | 0 | 0 | 0 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for objectively evaluating quality of a stereo image comprising following steps of:
(1) defining an original stereo image which is utilized for referring in an objective quality evaluation of the stereo image as a reference stereo image, a left-view of the reference stereo image is denoted as $I_l$, a right-view of the reference stereo image is denoted as $I_r$, a cyclopean image of the reference stereo image formed in a human visual system is denoted as C;
defining a distortion image of the reference stereo image which is used for testing in the objective quality evaluation of the stereo image as a testing stereo image, a left-view of the testing stereo image is denoted as $\hat{I}_l$, a right-view of the testing stereo image is denoted as $\hat{I}_r$, a cyclopean image of the testing stereo image formed in the human visual system is denoted as $\hat{C}$, wherein sizes of the left-view of the reference stereo image $I_l$, the right-view of the reference stereo image $I_r$, the left-view of the testing stereo image $\hat{I}_l$, and the right-view of the testing stereo image $\hat{I}_r$, are all denoted as W×H, wherein W refers to a width thereof, and H refers to a height thereof;
(2) classifying the cyclopean image $\hat{C}$ of the testing stereo image formed in the human visual system into three areas, wherein:
a first area thereof is an occlusion area, which is denoted as $\hat{R}_{occ}$, information of the occlusion area $\hat{R}_{occ}$ exists only in the left-view or the right-view of the testing stereo image;
a second area thereof is a binocular suppression area, which is denoted as $\hat{R}_{bs}$, information of the binocular suppression area $\hat{R}_{bs}$ is binocular information having great image content difference or great disparity between the left-view and the right-view of the testing stereo image; and
a third area thereof is a binocular fusion area, which is denoted as $\hat{R}_{bf}$, information of the binocular fusion area $\hat{R}_{bf}$ is binocular information having similar image content and small disparity between the left-view and the right-view of the testing stereo image;
(3) dividing the cyclopean image $\hat{C}$ of the testing stereo image formed in the human visual system into a plurality of image blocks which are non-overlapped with each other and have a size of k×k,
classifying all of the image blocks into three types: an occlusion block, a binocular suppression block and a binocular fusion block,
updating $\hat{R}_{occ}$, $\hat{R}_{bs}$ and $\hat{R}_{bf}$ according to types of the image blocks, so as to obtain an updated occlusion area $\hat{R}_{occ}'$, an updated binocular suppression area $\hat{R}_{bs}'$ and an updated binocular fusion area $\hat{R}_{bf}'$;
in the cyclopean image C of the reference stereo image formed in the human visual system, obtaining an area $R_{occ}'$ corresponding to a position of $\hat{R}_{occ}'$, an area $R_{bs}'$ corresponding to a position of $\hat{R}_{bs}'$, and an area $R_{bf}'$ corresponding to a position of $\hat{R}_{bf}'$;
processing singular value decomposition respectively on all of the image blocks having a size of k×k in the area $\hat{R}_{occ}'$, an area $\hat{R}_{bs}^{h}$ corresponding to left-view of $\hat{R}_{bs}'$, an area $\hat{R}_{bs}^{r}$ corresponding to right-view of $\hat{R}_{bs}'$, an area $\hat{R}_{bf}^{h}$ corresponding to left-view of $\hat{R}_{bf}'$, an area $\hat{R}_{bf}^{r}$ corresponding to right-view of $\hat{R}_{bf}'$, the area $R_{occ}'$, an area $R_{bs}^{h}$ corresponding to left-view of $R_{bs}'$, an area $R_{bs}^{r}$ corresponding to right-view of $R_{bs}'$, an area $R_{bf}^{h}$ corresponding to left-view of $R_{bf}'$, and an area $R_{bf}^{r}$ corresponding to right-view of $R_{bf}'$, in such a manner that singular values respectively corresponding to each image block are obtained, wherein k>1;
(4) obtaining an overall distortion degree $Q_{occ}$ of $\hat{R}_{occ}'$ according to singular value distances between all of the image blocks which are in corresponding positions in $\hat{R}_{occ}'$ and $R_{occ}'$ and have a size of k×k,
obtaining an overall distortion degree $Q_{bs}$ of $\hat{R}_{bs}'$ according to singular value distances between all of the image blocks which are in corresponding positions in $\hat{R}_{bs}^{\,l}$ and $R_{bs}^{\,l}$ and have a size of k×k, and singular value distances between all of the image blocks which are in corresponding positions in $\hat{R}_{bs}^{\,r}$ and $R_{bs}^{\,r}$ and have a size of k×k, and obtaining an overall distortion degree $Q_{bf}$ of $\hat{R}_{bf}'$ according to singular value distances between all of the image blocks which are in corresponding positions in $\hat{R}_{bf}^{\,l}$ and $R_{bf}^{\,l}$ and have a size of k×k, and singular value distances between all of the image blocks which are in corresponding positions of $\hat{R}_{bf}^{\,r}$ and $R_{bf}^{\,r}$ and have a size of k×k; and ⑤ according to the overall distortion degree $Q_{occ}$ of $\hat{R}_{occ}'$, the overall distortion degree $Q_{bs}$ of $\hat{R}_{bs}'$ and the overall distortion degree $Q_{bf}$ of $\hat{R}_{bf}'$, calculating an overall distortion degree Q of the testing stereo image by an equation of linear regression, wherein $Q = a \times Q_{occ} + b \times Q_{bs} + c \times Q_{bf}$, wherein a, b and c are all coefficients and satisfy:

$$\begin{cases} a+b+c=1 \\ 0 \le a \le 1 \\ 0 \le b \le 1 \\ 0 \le c \le 1. \end{cases}$$

2. The method for objectively evaluating quality of a stereo image, as recited in claim 1, wherein specific process of the step ② comprises:

②-1 denoting a pixel having a position coordinate of (x,y) in the left-view image $I_l$ of the reference stereo image as $p_{x,y}^{\,l}$, denoting a pixel having a position coordinate of (s,t) in the right-view image $I_r$ of the reference stereo image as $p_{s,t}^{\,r}$, denoting a pixel having a position coordinate of (x,y) in the left-view image $\hat{I}_l$ of the testing stereo image as $\hat{p}_{x,y}^{\,l}$, and denoting a pixel having a position coordinate of (s,t) in the right-view image $\hat{I}_r$ of the testing stereo image as $\hat{p}_{s,t}^{\,r}$, wherein 1≤x≤W, 1≤y≤H, 1≤s≤W and 1≤t≤H;

②-2 processing stereo matching on the reference stereo image, so as to obtain a horizontal disparity and a vertical disparity of each pixel of the reference stereo image, wherein a specific process thereof comprises:

judging whether $p_{x,y}^{\,l}$ is matched with $p_{s,t}^{\,r}$, wherein:

if $p_{x,y}^{\,l}$ is matched with $p_{s,t}^{\,r}$, matching relationship of $p_{x,y}^{\,l}$ and $p_{s,t}^{\,r}$ is presented as $(p_{x,y}^{\,l}, p_{s,t}^{\,r})$, horizontal disparities of $p_{x,y}^{\,l}$ and $p_{s,t}^{\,r}$ are both denoted as $d_{x,y}^{\,h}$, wherein $d_{x,y}^{\,h} = |s-x|$, vertical disparities of $p_{x,y}^{\,l}$ and $p_{s,t}^{\,r}$ are both denoted as $d_{x,y}^{\,v}$, wherein $d_{x,y}^{\,v} = |t-y|$, if no pixel is matched with $p_{x,y}^{\,l}$ in the right-view $I_r$ of the reference stereo image, matching relationship of $p_{x,y}^{\,l}$ is presented as $(p_{x,y}^{\,l}, \phi)$, and the horizontal disparity and the vertical disparity of $p_{x,y}^{\,l}$ are both determined to be 255, and if no pixel is matched with $p_{s,t}^{\,r}$ in the left-view image $I_l$ of the reference stereo image, matching relationship of $p_{s,t}^{\,r}$ is presented as $(\phi, p_{s,t}^{\,r})$, and the horizontal disparity and the vertical disparity of $p_{s,t}^{\,r}$ are both determined to be 255, wherein "||" is an absolute value sign, "φ" is an empty set sign;

③-3 processing stereo matching on the testing stereo image, so as to obtain a horizontal disparity and a vertical disparity of each pixel of the testing stereo image, wherein a specific process thereof comprises:

judging whether $\hat{p}_{x,y}^{\,l}$ is matched with $\hat{p}_{s,t}^{\,r}$, wherein:

if $\hat{p}_{x,y}^{\,l}$ is matched with $\hat{p}_{s,t}^{\,r}$, matching relationship of $\hat{p}_{x,y}^{\,l}$ and $\hat{p}_{s,t}^{\,r}$ is presented as $(\hat{p}_{x,y}^{\,l}, \hat{p}_{s,t}^{\,r})$, the horizontal disparities of $\hat{p}_{x,y}^{\,l}$ and $\hat{p}_{s,t}^{\,r}$ are both denoted as $\hat{d}_{x,y}^{\,h}$, wherein $\hat{d}_{x,y}^{\,h} = |s-x|$, the vertical disparities of $\hat{p}_{x,y}^{\,l}$ and $\hat{p}_{s,t}^{\,r}$ are both denoted as $\hat{d}_{x,y}^{\,v}$, wherein $\hat{d}_{x,y}^{\,v} = |t-y|$, if no pixel is matched with $\hat{p}_{x,y}^{\,l}$ in the right-view $\hat{I}_r$ of the testing stereo image, matching relationship of $\hat{p}_{x,y}^{\,l}$ is presented as $(\hat{p}_{x,y}^{\,l}, \phi)$, and the horizontal disparity and the vertical disparity of $\hat{p}_{x,y}^{\,l}$ are both determined to be 255, and if no pixel is matched with $\hat{p}_{s,t}^{\,r}$ in the left-view $\hat{I}_l$ of the testing stereo image, matching relationship of $\hat{p}_{s,t}^{\,r}$ is presented as $(\phi, \hat{p}_{s,t}^{\,r})$, and the horizontal disparity and the vertical disparity of $\hat{p}_{s,t}^{\,r}$ are both determined to be 255, wherein "||" is an absolute value sign, "φ" is an empty set sign;

②-4 dividing the cyclopean image of the testing stereo image formed in the human visual system $\hat{C}$ into an occlusion $\hat{R}_{occ}$ and a match area $\hat{R}_{match}$, wherein the occlusion area $\hat{R}_{occ}$ comprises a left-view occlusion area $\hat{R}_{occ}^{\,l}$ and a right-view occlusion area $\hat{R}_{occ}^{\,r}$, wherein $\hat{R}_{occ} = \hat{R}_{occ}^{\,l} \cup \hat{R}_{occ}^{\,r}$, wherein the left-view occlusion area $h_{occ}^{\,l}$ is a set of pixels having a matching relationship of $(\hat{p}_{x,y}^{\,l}, \phi)$ in the left-view $\hat{I}_l$ of the testing stereo image, which are presented as $\hat{R}_{occ}^{\,l} = \{\hat{p}_{x,y}^{\,l} | (\hat{p}_{x,y}^{\,l}, \phi) \wedge \hat{p}_{x,y}^{\,l} \in \hat{I}_l\}$, the right-view occlusion area $\hat{R}_{occ}^{\,r}$ is a set of pixels having a matching relationship of $(\phi, \hat{p}_{s,t}^{\,r})$ in the right-view $\hat{I}_r$ of the testing stereo image, which is presented as $\hat{R}_{occ}^{\,r} = \{\hat{p}_{s,t}^{\,r} | (\phi, \hat{p}_{s,t}^{\,r}) \wedge \hat{p}_{s,t}^{\,r} \in \hat{I}_r\}$, the match area $\hat{R}_{match}$ is a set of matched pixels of the left-view $\hat{I}_l$ of the testing stereo image and the right-view $\hat{I}_r$ of the testing stereo image, which having a matching relationship of $(\hat{p}_{x,y}^{\,l}, \hat{p}_{s,t}^{\,r})$, wherein "∪" is an operational sign of a union, "∧" is an operational sign of "and"; and ②-5 further dividing the match area $\hat{R}_{match}$ into a binocular suppression area $\hat{R}_{bs}$ and a binocular fusion area $\hat{R}_{bf}$, wherein:

the binocular suppression area $\hat{R}_{bs}$ is an integrated area formed by processing binocular suppression on the left-view corresponding area $\hat{R}_{bs}^{\,l}$ of $\hat{R}_{bs}$ and the right-view corresponding area $\hat{R}_{bs}^{\,r}$ of $\hat{R}_{bs}$, and the binocular fusion area $\hat{R}_{bf}$ is an integrated area formed by processing binocular fusion on the left-view corresponding area $\hat{R}_{bf}^{\,l}$ of $\hat{R}_{bf}$ and the right-view corresponding view $\hat{R}_{bf}^{\,r}$ of $\hat{R}_{bf}$, wherein:

$\hat{R}_{bs}^{\,l} = \{\hat{p}_{x,y}^{\,l} | \hat{p}_{x,y}^{\,l} \in \hat{I}_l \wedge \hat{p}_{s,t}^{\,r} \in \hat{I}_r \wedge (\hat{p}_{x,y}^{\,l}, \hat{p}_{s,t}^{\,r}) \wedge |\hat{d}_{x,y}^{\,h}| + |\hat{d}_{x,y}^{\,v}| > |d_{x,y}^{\,h}| + |d_{x,y}^{\,v}|\}$, $\hat{R}_{bs}^{\,r} = \{\hat{p}_{s,t}^{\,r} | \hat{p}_{x,y}^{\,l} \in \hat{I}_l \wedge \hat{p}_{s,t}^{\,r} \in \hat{I}_r \wedge (\hat{p}_{x,y}^{\,l}, \hat{p}_{s,t}^{\,r}) \wedge |\hat{d}_{x,y}^{\,h}| + |\hat{d}_{x,y}^{\,v}| > |d_{x,y}^{\,h}| + |d_{x,y}^{\,v}|\}$, $\hat{R}_{bf}^{\,l} = \{\hat{p}_{x,y}^{\,l} | \hat{p}_{x,y}^{\,l} \in \hat{I}_l \wedge \hat{p}_{s,t}^{\,r} \in \hat{I}_r \wedge (\hat{p}_{x,y}^{\,l}, \hat{p}_{s,t}^{\,r}) \wedge |\hat{d}_{x,y}^{\,h}| + |\hat{d}_{x,y}^{\,v}| \le |d_{x,y}^{\,h}| + |d_{x,y}^{\,v}|\}$, and $\hat{R}_{bf}^{\,r} = \{\hat{p}_{s,t}^{\,r} | \hat{p}_{x,y}^{\,l} \in \hat{I}_l \wedge \hat{p}_{s,t}^{\,r} \in \hat{I}_r \wedge (\hat{p}_{x,y}^{\,l}, \hat{p}_{s,t}^{\,r}) \wedge |\hat{d}_{x,y}^{\,h}| + |\hat{d}_{x,y}^{\,v}| \le |d_{x,y}^{\,h}| + |d_{x,y}^{\,v}|\}$.

3. The method for objectively evaluating quality of a stereo image, as recited in claim 1, wherein specific process of the step ③ comprises:

③-1 dividing the cyclopean image $\hat{C}$ of the testing stereo image formed in the human visual system into a plurality of image blocks which are non-overlapped with each other and have a size of k×k, classifying all of the image blocks of the cyclopean image $\hat{C}$ of the testing stereo image formed in the human visual system into three types: an occlusion block, a binocular suppression block and a binocular fusion block, wherein specific process of the classifying comprises:

denoting any one of the image blocks of the cyclopean image $\hat{C}$ of the testing stereo image formed in the human visual system as $\hat{B}$, and judging whether there is a pixel belonging to $\hat{R}_{occ}$ in the $\hat{B}$, wherein if yes, mark $\hat{B}$ as a occlusion block; if no, further judge whether there is a pixel belonging to $\hat{R}_{bs}$ in $\hat{B}$, if yes, mark $\hat{B}$ as a binocular suppression block, if no mark $\hat{B}$ as a binocular fusion block, wherein k>1;

③-2 defining an area constituted by all of the occlusion blocks of the cyclopean image $\hat{C}$ of the testing stereo image formed in the human visual system as an updated occlusion area, which is denoted as $\hat{R}_{occ}'$, defining an area constituted by all of the binocular suppression blocks of the cyclopean image $\hat{C}$ of the testing stereo image formed in the human visual system as an updated binocular suppression area, which is denoted as $\hat{R}_{bf}'$, and defining an area constituted by all of the binocular fusion blocks of the cyclopean image $\hat{C}$ of the testing stereo image formed in the human visual system as an updated binocular fusion area, which is denoted as $\hat{R}_{bf}'$, wherein the left-view corresponding area of the updated occlusion area $\hat{R}_{occ}'$ is denoted as $\hat{R}_{occ}^{\prime h}$, the right-view corresponding area of $\hat{R}_{occ}'$ is denoted as $\hat{R}_{occ}^{\prime n}$, left-view corresponding area of the updated binocular suppression area $\hat{R}_{bs}'$ is denoted as $\hat{R}_{bs}^{\prime h}$, the right-view corresponding area of $\hat{R}_{bs}'$ is denoted as $\hat{R}_{bs}^{\prime n}$, the left-view corresponding area of the updated binocular fusion area $\hat{R}_{bf}'$ is denoted as $\hat{R}_{bf}^{\prime h}$, and the right-view corresponding area of $\hat{R}_{bf}'$ is denoted as $\hat{R}_{bf}^{\prime n}$;

③-3 denoting the area corresponding to the position of $\hat{R}_{occ}'$ in the cyclopean image C of the reference stereo image formed in the human visual system as $R_{occ}'$, wherein $R_{occ}' = R_{occ}^{\prime h} \cup R_{occ}^{\prime n}$, wherein "∪" is an operational sign for union in a set, wherein $R_{occ}^{\prime h}$ is the area corresponding to the position of $R_{occ}^{\prime h}$ in the cyclopean image C of the reference stereo image formed in the human visual system, $R_{occ}^{\prime h} = \{p_{x,y}^{l} | p_{x,y}^{l} \in I_l \wedge \hat{p}_{x,y}^{l} \in \hat{R}_{occ}^{\prime h}\}$, wherein $R_{occ}^{\prime n}$ is the area corresponding to the position of $\hat{R}_{occ}^{\prime n}$ in the cyclopean image C of the reference stereo image formed in the human visual system, $R_{occ}^{\prime n} = \{p_{s,t}^{r} | p_{s,t}^{r} \in I_r \wedge \hat{p}_{s,t}^{r} \in \hat{R}_{occ}^{\prime n}\}$;

③-4 denoting the area corresponding to the position of $\hat{R}_{bs}^{\prime h}$ in the cyclopean image C of the reference stereo image formed in the human visual system as $R_{bs}^{\prime h}$, wherein $R_{bs}^{\prime h} = \{p_{x,y}^{l} | p_{x,y}^{l} \in I_l \wedge \hat{p}_{x,y}^{l} \in \hat{R}_{bs}^{\prime h}\}$, and denoting the area corresponding to the position of $\hat{R}_{bs}^{\prime n}$ in the cyclopean image C of the reference stereo image formed in the human visual system as $R_{bs}^{\prime n}$, wherein $R_{bs}^{\prime n} = \{p_{s,t}^{r} | p_{s,t}^{r} \in I_r \wedge \hat{p}_{s,t}^{r} \in \hat{R}_{bs}^{\prime n}\}$;

③-5 denoting the area corresponding to the position of $\hat{R}_{bf}^{\prime h}$ in the cyclopean image C of the reference stereo image formed in the human visual system as $R_{bf}^{\prime h}$, wherein $R_{bf}^{\prime h} = \{p_{x,y}^{l} | p_{x,y}^{l} \in I_l \wedge \hat{p}_{x,y}^{l} \in \hat{R}_{bf}^{\prime h}\}$, and denoting the area corresponding to the position of $\hat{R}_{bf}^{\prime n}$ in the cyclopean image C of the reference stereo image formed in the human visual system as $\hat{R}_{bf}^{\prime n}$, wherein $R_{bf}^{\prime n} = \{p_{s,t}^{r} | p_{s,t}^{r} \in I_r \wedge \hat{p}_{s,t}^{r} \in \hat{R}_{bf}^{\prime n}\}$; and ③-6 processing the singular value decomposition respectively on all of the image blocks having the size of k×k in $\hat{R}_{occ}'$, $\hat{R}_{bs}^{\prime h}$, $\hat{R}_{bs}^{\prime n}$, $\hat{R}_{bf}'$, $\hat{R}_{bf}^{\prime n}$, $R_{occ}'$, $R_{bs}^{\prime h}$, $R_{bs}^{\prime n}$, $R_{bf}'$ and $R_{bf}^{\prime n}$, in such a manner that the singular values respectively corresponding to all image blocks having the size of k×k and in $\hat{R}_{occ}'$, $\hat{R}_{bs}^{\prime h}$, $\hat{R}_{bs}^{\prime n}$, $\hat{R}_{bf}^{\prime h}$, $\hat{R}_{bf}^{\prime n}$, $R_{occ}'$, $R_{bs}^{\prime h}$, $R_{bs}^{\prime n}$, $R_{bf}^{\prime h}$ and $R_{bf}^{\prime n}$ are obtained.

4. The method for objectively evaluating quality of a stereo image, as recited in claim 2, wherein specific process of the step ③ comprises:

③-1 dividing the cyclopean image $\hat{C}$ of the testing stereo image formed in the human visual system into a plurality of image blocks which are non-overlapped with each other and have a size of k×k, classifying all of the image blocks of the cyclopean image $\hat{C}$ of the testing stereo image formed in the human visual system into three types: an occlusion block, a binocular suppression block and a binocular fusion block, wherein specific process of the classifying comprises:

denoting any one of the image blocks of the cyclopean image $\hat{C}$ of the testing stereo image formed in the human visual system as $\hat{B}$, and judging whether there is a pixel belonging to $\hat{R}_{occ}$ in the $\hat{B}$, wherein if yes, mark $\hat{B}$ as a occlusion block; if no, further judge whether there is a pixel belonging to $\hat{R}_{bs}$ in $\hat{B}$, if yes, mark $\hat{B}$ as a binocular suppression block, if no mark $\hat{B}$ as a binocular fusion block, wherein k>1;

③-2 defining an area constituted by all of the occlusion blocks of the cyclopean image $\hat{C}$ of the testing stereo image formed in the human visual system as an updated occlusion area, which is denoted as $\hat{R}_{occ}'$, defining an area constituted by all of the binocular suppression blocks of the cyclopean image $\hat{C}$ of the testing stereo image formed in the human visual system as an updated binocular suppression area, which is denoted as $\hat{R}_{bf}'$, and defining an area constituted by all of the binocular fusion blocks of the cyclopean image $\hat{C}$ of the testing stereo image formed in the human visual system as an updated binocular fusion area, which is denoted as $\hat{R}_{bf}'$, wherein the left-view corresponding area of the updated occlusion area $\hat{R}_{occ}'$ is denoted as $\hat{R}_{occ}^{\prime h}$, the right-view corresponding area of $\hat{R}_{occ}'$ is denoted as $\hat{R}_{occ}^{\prime n}$ the left-view corresponding area of the updated binocular suppression area $\hat{R}_{bs}'$ is denoted as $\hat{R}_{bs}^{\prime h}$, the right-view corresponding area of $\hat{R}_{bs}'$ is denoted as $\hat{R}_{bs}^{\prime n}$, the left-view corresponding area of the updated binocular fusion area $\hat{R}_{bf}'$ is denoted as $\hat{R}_{bf}^{\prime h}$, and the right-view corresponding area of $\hat{R}_{bf}'$ is denoted as $\hat{R}_{bf}^{\prime n}$;

③-3 denoting the area corresponding to the position of $\hat{R}_{occ}'$ in the cyclopean image C of the reference stereo image formed in the human visual system as $R_{occ}'$, wherein $R_{occ}' = R_{occ}^{\prime h} \cup R_{occ}^{\prime n}$, wherein "∪" is an operational sign for union in a set, wherein $R_{occ}^{\prime h}$ is the area corresponding to the position of $\hat{R}_{occ}^{\prime h}$ in the cyclopean image C of the reference stereo image formed in the human visual system, $R_{occ}^{\prime h} = \{p_{x,y}^{l} | p_{x,y}^{l} \in I_l \wedge \hat{p}_{x,y}^{l} \in \hat{R}_{occ}^{\prime h}\}$, wherein $R_{occ}^{\prime n}$ is the area corresponding to the position of $\hat{R}_{occ}^{\prime n}$ in the cyclopean image C of the reference stereo image formed in the human visual system, $R_{occ}^{\prime h} = \{p_{s,t}^{r} | p_{s,t}^{r} \in I_r \wedge \hat{p}_{s,t}^{r} \in \hat{R}_{occ}^{\prime n}\}$;

③-4 denoting the area corresponding to the position of $\hat{R}_{bs}^{\prime h}$ in the cyclopean image C of the reference stereo image formed in the human visual system as $R_{bs}^{\prime h}$, wherein $R_{bs}^{\prime h} = \{p_{x,y}^{l} | p_{x,y}^{l} \in I_l \wedge \hat{p}_{x,y}^{l} \in \hat{R}_{bs}^{\prime h}\}$, and denoting the area corresponding to the position of $\hat{R}_{bs}^{\prime n}$ in the cyclopean image C of the reference stereo image formed in the human visual system as $R_{bs}^{\prime n}$, wherein $R_{bs}^{\prime n} = \{p_{s,t}^{r} | p_{s,t}^{r} \in I_r \wedge \hat{p}_{s,t}^{r} \in \hat{R}_{bs}^{\prime n}\}$;

③-5 denoting the area corresponding to the position of $\hat{R}_{bf}^{\prime h}$ in the cyclopean image C of the reference stereo image formed in the human visual system as $R_{bf}^{\prime h}$, wherein $R_{bf}^{\prime h} = \{p_{x,y}^{l} | p_{x,y}^{l} \in I_l \wedge \hat{p}_{x,y}^{l} \in \hat{R}_{bf}^{\prime h}\}$, and denoting the area corresponding to the position of $\hat{R}_{bf}{}^{rh}$ in the cyclopean image C of the reference stereo image formed in the human visual system as $R_{bf}{}^{rh}$, wherein $R_{bf}{}^{rh}=\{p_{s,t}{}^{r}|p_{s,t}{}^{r}\in I_{r}\wedge \hat{p}_{s,t}{}^{r}\in \hat{R}_{bf}{}^{rh}\}$; and ③-6 processing the singular value decomposition respectively on all of the image blocks having the size of k×k in $\hat{R}_{occ}{}^{l}$, $\hat{R}_{bs}{}^{lh}$, $\hat{R}_{bs}{}^{rh}$, $\hat{R}_{bf}{}^{lh}$, $\hat{R}_{bf}{}^{rh}$, $R_{occ}{}^{l}$, $R_{bs}{}^{lh}$, $R_{bs}{}^{rh}$, $R_{bf}{}^{lh}$ and $R_{bf}{}^{rh}$ in such a manner that the singular values respectively corresponding to all image blocks having the size of k×k and in $\hat{R}_{occ}{}^{l}$, $\hat{R}_{bs}{}^{lh}$, $\hat{R}_{bs}{}^{rh}$, $\hat{R}_{bf}{}^{lh}$, $\hat{R}_{bf}{}^{rh}$, $R_{occ}{}^{l}$, $R_{bs}{}^{lh}$, $R_{bs}{}^{rh}$, $R_{bf}{}^{lh}$ and $R_{bf}{}^{rh}$ are obtained.

5. The method for objectively evaluating quality of a stereo image, as recited in claim 3, wherein in the step ③-1, k=4.

6. The method for objectively evaluating quality of a stereo image, as recited in claim 4, wherein in the step ③-1, k=4.

7. The method for objectively evaluating quality of a stereo image, as recited in claim 3, wherein specific process of the step ④ comprises:

④-1 calculating the singular value distances between the image blocks which are in all corresponding positions of $\hat{R}_{occ}{}^{l}$ and $R_{occ}{}^{l}$ and have the size of k×k, wherein an ith occlusion block in $\hat{R}_{occ}{}^{l}$ is denoted as $\hat{B}_{i}$, in $R_{occ}{}^{l}$ an ith occlusion block in a corresponding position of $\hat{B}_{i}$ is denoted as $B_{i}$, a singular value distance between $\hat{B}_{i}$ and $B_{i}$ is calculated and is denoted as $D_{occ}(i)$, $$D_{occ}(i) = \sqrt{\sum_{j=1}^{k}(s_{i,j} - \hat{s}_{i,j})^2},$$

calculating the singular value distances corresponding to all of the occlusion blocks in $\hat{R}_{occ}{}^{l}$ as the overall distortion degree of $\hat{R}_{occ}{}^{l}$, which is denoted as $Q_{occ}$, wherein $$Q_{occ} = \frac{1}{N_{occ}}\sum_{i=1}^{N_{occ}}|D_{occ}(i) - D_{occ}(m)|,$$

wherein $1 \le i \le N_{occ}$, $N_{occ}$ refers to a number of all of the occlusion blocks in $R_{occ}{}^{l}$, and $N_{occ}$ is also a number of all of the occlusion blocks in $R_{occ}{}^{l}$, $1 \le j \le k$, k refers to a number of singular values in one of the image blocks, $s_{i,j}$ refers to a j th singular value of $B_{i}$, $\hat{s}_{i,j}$ refers to the jth singular value of $\hat{B}_{i}$, "||" is an absolute value sign, and $D_{occ}(m)$ refers to a median of $D_{occ}(1), D_{occ}(2), \ldots, D_{occ}(N_{occ})$;

④-2 calculating the singular value distances between the image blocks which are in all corresponding positions of $\hat{R}_{bs}{}^{lh}$ and $R_{bs}{}^{lh}$ and have the size of k×k, wherein an i'th binocular suppression block in $\hat{R}_{bs}{}^{lh}$ is denoted as $\hat{B}_{i'}{}^{l}$ in $R_{bs}{}^{lh}$ an i'th binocular suppression block in a corresponding position of $\hat{B}_{i'}{}^{l}$ is denoted as $B_{i'}{}^{l}$, a singular value distance between $\hat{B}_{i'}{}^{l}$ and $B_{i'}{}^{l}$ is calculated and is denoted as $D_{bs}{}^{l}(i')$, $$D_{bs}^{l}(i') = \sqrt{\sum_{j=1}^{k}(s_{i',j}^{l} - \hat{s}_{i',j}^{l})^2},$$

calculating the singular value distances between the image blocks which are in all corresponding positions of $\hat{R}_{bs}{}^{rh}$ and $R_{bs}{}^{rh}$ and have the size of k×k, wherein an i'th binocular suppression block in $\hat{R}_{bs}{}^{rh}$ is denoted as $\hat{B}_{i'}{}^{r}$, in $R_{bs}{}^{rh}$ an i'th binocular suppression block in a corresponding position of $\hat{B}_{i'}{}^{r}$ is denoted as $B_{i'}{}^{r}$, a singular value distance between $\hat{B}_{i'}{}^{r}$ and $B_{i'}{}^{r}$ is calculated and is denoted as $D_{bs}{}^{r}(i')$, $$D_{bs}^{r}(i') = \sqrt{\sum_{j=1}^{k}(s_{i',j}^{r} - \hat{s}_{i',j}^{r})^2},$$

calculating the singular value distances of all of the binocular suppression blocks in $\hat{R}_{bs}{}^{l}$, wherein an i'th binocular suppression block in $\hat{R}_{bs}{}^{l}$ is denoted as $\hat{B}_{i'}$, and its singular value distance is calculated and denoted as $D_{bs}(i')$, $D_{bs}(i')=\min\{D_{bs}{}^{l}(i'), D_{bs}{}^{r}(i')\}$, and calculating the singular value distances corresponding to all of the binocular suppression blocks in $\hat{R}_{bs}{}^{l}$ as the overall distortion degree of $\hat{R}_{bs}{}^{l}$, which is denoted as $Q_{bs}$, wherein $$Q_{bs} = \frac{1}{N_{bs}}\sum_{i'=1}^{N_{bs}}|D_{bs}(i') - D_{bs}(m)|,$$

wherein $1 \le i' \le N_{bs}$, $N_{bs}$ refers to a number of all of the binocular suppression blocks in $\hat{R}_{bs}{}^{lh}$ or $\hat{R}_{bs}{}^{rh}$, $1 \le j \le k$, k refers to a number of singular values in one of the image blocks, $s_{i',j}^{l}$ refers to a j th singular value of $B_{i'}{}^{r}$, $\hat{s}_{i',j}^{r}$ refers to the jth singular value of $\hat{B}_{i'}{}^{l}$, $s_{i',j}^{r}$ refers to a j th singular value of $B_{i'}{}^{r}$, $\hat{s}_{i',j}^{r}$ refers to a jth singular value of $\hat{B}_{i'}{}^{r}$, min ( ) is a sign for a minimum value, "||" an absolute value sign, and $D_{bs}(m)$ refers to a median of $D_{bs}(1), D_{bs}(2), \ldots, D_{bs}(N_{bs})$; and ④-3 calculating the singular value distances between the image blocks which are in all corresponding positions of $\hat{R}_{bf}{}^{lh}$ and $R_{bf}{}^{lh}$ and have the size of k×k, wherein an i''th binocular fusion block $\hat{R}_{bf}{}^{lh}$ is denoted as $\hat{B}_{i''}{}^{l}$, in $R_{bf}{}^{lh}$ an i''th binocular fusion block in a corresponding position of $\hat{B}_{i''}{}^{l}$ is denoted as $B_{i''}{}^{l}$, a singular value distance between $\hat{B}_{i''}{}^{l}$ and $B_{i''}{}^{l}$ is calculated and is denoted as $D_{bf}{}^{l}(i'')$, $$D_{bf}^{l}(i'') = \sqrt{\sum_{j=1}^{k}(s_{i'',j}^{l} - \hat{s}_{i'',j}^{l})^2},$$

calculating the singular value distances between the image blocks which are in all corresponding positions of $\hat{R}_{bf}{}^{rh}$ and $R_{bf}{}^{rh}$ and have the size of k×k, wherein an i''th binocular fusion block in $\hat{R}_{bf}{}^{rh}$ is denoted as $\hat{B}_{i''}{}^{r}$ in $R_{bf}{}^{rh}$ an i''th binocular fusion block in a corresponding position of $\hat{B}_{i''}{}^{r}$ is denoted as $B_{i''}{}^{r}$, a singular value distance between $\hat{B}_{i''}{}^{r}$ and $B_{i''}{}^{r}$ is calculated and is denoted as $D_{bf}{}^{r}(i'')$, $$D_{bf}^{r}(i'') = \sqrt{\sum_{j=1}^{k}(s_{i'',j}^{r} - \hat{s}_{i'',j}^{r})^2},$$

calculating the singular value distances of all of the binocular fusion blocks in $\hat{R}_{bf}{}^{lh}$ for serving as an overall distortion degree of $\hat{R}_{bf}{}^{lh}$, which is denoted as $Q_{bf}{}^{l}$, $$Q_{bf}^{l} = \frac{1}{N_{bf}}\sum_{i''=1}^{N_{bf}}|D_{bf}^{l}(i'') - D_{bf}^{l}(m)|,$$

calculating the singular value distances of all of the binocular fusion blocks in $\hat{R}_{bf}{}^r$ for serving as an overall distortion degree of $\hat{R}_{bf}{}^r$, which is denoted as $Q_{bf}{}^r$, $$Q_{bf}^r = \frac{1}{N_{bf}} \sum_{i''=1}^{N_{bf}} |D_{bf}^r(i'') - D_{bf}^r(m)|,$$

and calculating an overall distortion degree of $\hat{R}_{bf}{}^l$ according to $Q_{bf}{}^l$ and $Q_{bf}{}^r$, which is denoted as $Q_{bf}$, $Q_{bf}=0.7\times(Q_{bf}{}^l+Q_{bf}{}^r)$, wherein $1 \leq i'' \leq N_{bf}$, $N_{bf}$ refers to a number of all of the binocular fusion blocks in $\hat{R}_{bf}{}^h$ or $\hat{R}_{bf}{}^n$, $1 \leq j \leq k$, k refers to a number of singular values in one of the image blocks, $s_{i'',j}{}^l$ refers to a jth singular value of $B_{i''}{}^l$, $\hat{s}_{i'',j}{}^l$ refers to the jth singular value of $\hat{B}_{i''}{}^h$, $s_{i'',j}{}^r$ refers to a jth singular value of $B_{i''}{}^l$, $\hat{s}_{i'',j}{}^l$ refers to a jth singular value of $\hat{B}_{i''}{}^r$, "$\|$" is an absolute value sign, and $D_{bf}{}^l(m)$ refers to a median of $D_{bf}{}^l(1)$, $D_{bf}{}^l(2)$, ..., $D_{bf}{}^l(N_{bf})$, $D_{bf}{}^r(m)$ refers to a median of $D_{bf}{}^r(1)$, $D_{bf}{}^r(2)$, ..., $D_{bf}{}^r(N_{bf})$.

8. The method for objectively evaluating quality of a stereo image, as recited in claim 4, wherein specific process of the step ④ comprises:

④-1 calculating the singular value distances between the image blocks which are in all corresponding positions of $\hat{R}_{occ}{}'$ and $R_{occ}{}'$ and have the size of k×k, wherein an ith occlusion block in $\hat{R}_{occ}{}'$ is denoted as $\hat{B}_i$, in $R_{occ}{}'$ an ith occlusion block in a corresponding position of $\hat{B}_i$ is denoted as $B_i$, a singular value distance between $\hat{B}_i$ and $B_i$ is calculated and is denoted as $D_{occ}(i)$, $$D_{occ}(i) = \sqrt{\sum_{j=1}^{k} (s_{i,j} - \hat{s}_{i,j})^2},$$

calculating the singular value distances corresponding to all of the occlusion blocks in $\hat{R}_{occ}{}'$ as the overall distortion degree of which is denoted as $Q_{occ}$, wherein $$Q_{occ} = \frac{1}{N_{occ}} \sum_{i=1}^{N_{occ}} |D_{occ}(i) - D_{occ}(m)|,$$

wherein $1 \leq i \leq N_{occ}$, $N_{occ}$ refers to a number of all of the occlusion blocks in and $\hat{R}_{occ}{}'$, and $N_{occ}$ is also a number of all of the occlusion blocks in $R_{occ}{}'$, $1 \leq j \leq k$, k refers to a number of singular values in one of the image blocks, $s_{i,j}$ refers to a jth singular value of $B_i$, $\hat{s}_{i,j}$ refers to the jth singular value of $\hat{B}_i$, "$\|$" is an absolute value sign, and $D_{occ}(m)$ refers to a median of $D_{occ}(1)$, $D_{occ}(2)$, ..., $D_{occ}(N_{occ})$;

④-2 calculating the singular value distances between the image blocks which are in all corresponding positions of $\hat{R}_{bs}{}^h$ and $R_{bs}{}^h$ and have the size of k×k, wherein an i'th binocular suppression block in $\hat{R}_{bs}{}^h$ is denoted as $\hat{B}_{i'}{}^l$, in $R_{bs}{}^h$ an i'th binocular suppression block in a corresponding position of $\hat{B}_{i'}{}^l$ is denoted as $B_{i'}{}^l$, a singular value distance between $\hat{B}_{i'}{}^l$ and $B_{i'}{}^l$ is calculated and is denoted as $D_{bs}{}^l(i')$, $$D_{bs}^l(i') = \sqrt{\sum_{j=1}^{k} (s_{i',j}^l - \hat{s}_{i',j}^l)^2},$$

calculating the singular value distances between the image blocks which are in all corresponding positions of $\hat{R}_{bs}{}^n$ and $R_{bs}{}^n$ and have the size of k×k, wherein an i'th binocular suppression block in $\hat{R}_{bs}{}^n$ is denoted as $\hat{B}_{i'}{}^r$, in $R_{bs}{}^n$ an i'th binocular suppression block in a corresponding position of $\hat{B}_{i'}{}^r$ is denoted as $B_{i'}{}^r$, a singular value distance between $\hat{B}_{i'}{}^r$ and $B_{i'}{}^r$ is calculated and is denoted as $D_{bs}{}^r(i')$, $$D_{bs}^r(i') = \sqrt{\sum_{j=1}^{k} (s_{i',j}^r - \hat{s}_{i',j}^r)^2},$$

calculating the singular value distances of all of the binocular suppression blocks in $\hat{R}_{bs}{}'$, wherein an i'th binocular suppression block in $\hat{R}_{bs}{}'$ is denoted as $\hat{B}_{i'}$, and its singular value distance is calculated and denoted as $D_{bs}(i')$, $D_{bs}(i')=\min\{D_{bs}{}^l(i'), D_{bs}{}^r(i')\}$, and calculating the singular value distances corresponding to all of the binocular suppression blocks in $\hat{R}_{bs}{}'$ as the overall distortion degree of $\hat{R}_{bs}{}'$, which is denoted as $Q_{bs}$, wherein $$Q_{bs} = \frac{1}{N_{bs}} \sum_{i'=1}^{N_{bs}} |D_{bs}(i') - D_{bs}(m)|,$$

wherein $1 \leq i' \leq N_{bs}$, $N_{bs}$ refers to a number of all of the binocular suppression blocks in $\hat{R}_{bs}{}^h$ or $\hat{R}_{bs}{}^n$, $1 \leq j \leq k$, k refers to a number of singular values in one of the image blocks, $s_{i',j}{}^l$ refers to a j singular value of $B_{i'}{}^l$, $\hat{s}_{i',j}{}^l$ refers to the jth singular value of $\hat{B}_{i'}{}^l$, $s_{i',j}{}^r$ refers to a j th singular value of $B_{i'}{}^r$, $\hat{s}_{i',j}{}^r$ refers to a jth singular value of $\hat{B}_{i'}{}^r$, min ( ) is a sign for a minimum value, "$\|$" is an absolute value sign, and $D_{bs}(m)$ refers to a median of $D_{bs}(1)$, $D_{bs}(2)$, ..., $D_{bs}(N_{bs})$; and ④-3 calculating the singular value distances between the image blocks which are in all corresponding positions of $\hat{R}_{bf}{}^h$ and $R_{bf}{}^h$ and have the size of k×k, wherein an i''th binocular fusion block in $\hat{R}_{bf}{}^h$ is denoted as $\hat{R}_{i''}{}^l$, an i''th binocular fusion block in a corresponding position of $\hat{R}_{i''}{}^l$ is denoted as $B_{i''}{}^l$, a singular value distance between $\hat{R}_{i''}{}^l$ and $B_{i''}{}^l$ is calculated and is denoted as $D_{bf}{}^l(i'')$ $$D_{bf}^l(i'') = \sqrt{\sum_{j=1}^{k} (s_{i'',j}^l - \hat{s}_{i'',j}^l)^2},$$

calculating the singular value distances between the image blocks which are in all corresponding positions of $\hat{R}_{bf}{}^n$ and $R_{bf}{}^n$ and have the size of k×k, wherein an i''th binocular fusion block in $\hat{R}_{bf}{}^n$ is denoted as $\hat{R}_{i''}{}^r$, an i''th binocular fusion block in a corresponding position of $\hat{R}_{i''}{}^n$ is denoted as $B_{i''}{}^r$, a singular value distance between $\hat{B}_{i''}{}^r$ and $B_{i''}{}^r$ is calculated and is denoted as $D_{bf}{}^r(i'')$, $$D_{bf}^r(i'') = \sqrt{\sum_{j=1}^{k} (s_{i'',j}^r - \hat{s}_{i'',j}^r)^2},$$

calculating the singular value distances of all of the binocular fusion blocks in $\hat{R}_{bf}^{l}$ for serving as an overall distortion degree of $\hat{R}_{bf}^{l}$, which is denoted as $Q_{bf}^{l}$, $$Q_{bf}^{l} = \frac{1}{N_{bf}} \sum_{i''=1}^{N_{bf}} |D_{bf}^{l}(i'') - D_{bf}^{l}(m)|,$$

calculating the singular value distances of all of the binocular fusion blocks in $\hat{R}_{bf}^{r}$ for serving as an overall distortion degree of $\hat{R}_{bf}^{r}$, which is denoted as $Q_{bf}^{r}$, $$Q_{bf}^{r} = \frac{1}{N_{bf}} \sum_{i''=1}^{N_{bf}} |D_{bf}^{r}(i'') - D_{bf}^{r}(m)|,$$

and calculating an overall distortion degree of $\hat{R}_{bf}$ according to $Q_{bf}^{l}$ and $Q_{bf}^{r}$, which is denoted as $Q_{bf}$, $Q_{bf}=0.7\times(Q_{bf}^{l}+Q_{bf}^{r})$, wherein $1 \leq i'' \leq N_{bf}$, $N_{bf}$ refers to a number of all of the binocular fusion blocks in $\hat{R}_{bf}^{l}$ or $\hat{R}_{bf}^{r}$, $1 \leq j \leq k$, k refers to a number of singular values in one of the image blocks, $s_{i'',j}^{r}$ refers to a jth singular value of $B_{i''}^{l}$, $\hat{s}_{i'',j}^{l}$ refers to the jth singular value of $\hat{R}_{i''}^{l}$, $s_{i'',j}^{r}$ refers to a jth singular value of $B_{i''}^{r}$, $\hat{s}_{i'',j}^{r}$ refers to a jth singular value of $\hat{B}_{i''}^{r}$, "||" is an absolute value sign, and $D_{bf}^{l}(m)$ refers to a median of $D_{bf}^{l}(1)$, $D_{bf}^{l}(2)$, ..., $D_{bf}^{l}(N_{bf})$, $D_{bf}^{r}(m)$ refers to a median of $D_{bf}^{r}(1)$, $D_{bf}^{r}(2)$, ..., $D_{bf}^{r}(N_{bf})$.

9. The method for objectively evaluating quality of the stereo image, as recited in claim 7, wherein in the step ⑤ a=0, b=0.5, c=0.5.

10. The method for objectively evaluating quality of the stereo image, as recited in claim 8, wherein in the step ⑤ a=0, b=0.5, c=0.5.

* * * * *